(12) United States Patent
Yi et al.

(10) Patent No.: US 11,395,148 B2
(45) Date of Patent: Jul. 19, 2022

(54) METHOD AND DEVICE FOR PROTECTING PRIVACY

(71) Applicant: HUAWEI TECHNOLOGIES CO., LTD., Guangdong (CN)

(72) Inventors: Qiang Yi, Beijing (CN); Shuiping Long, Beijing (CN); He Li, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 358 days.

(21) Appl. No.: 16/634,856

(22) PCT Filed: Jul. 30, 2017

(86) PCT No.: PCT/CN2017/095088
§ 371 (c)(1),
(2) Date: Jan. 28, 2020

(87) PCT Pub. No.: WO2019/023825
PCT Pub. Date: Feb. 7, 2019

(65) Prior Publication Data
US 2020/0213858 A1    Jul. 2, 2020

(51) Int. Cl.
*H04W 12/12*    (2021.01)
*H04W 12/122*    (2021.01)
(Continued)

(52) U.S. Cl.
CPC ......... *H04W 12/122* (2021.01); *H04W 12/33* (2021.01); *H04W 12/63* (2021.01); *H04W 12/72* (2021.01)

(58) Field of Classification Search
CPC ..... H04W 12/33; H04W 12/63; H04W 12/72; H04W 12/122
See application file for complete search history.

(56) References Cited

U.S. PATENT DOCUMENTS

2011/0238972 A1  9/2011 Semple et al.
2016/0262015 A1  9/2016 Lee et al.
(Continued)

FOREIGN PATENT DOCUMENTS

CN    102932784 A    2/2013
CN    103415010 A    11/2013
(Continued)

OTHER PUBLICATIONS

3GPP TR 33.843 0.1.0 (May 2017),3rd Generation Partnership Project;Technical Specification Group Services and System Aspects;Study on security Architecture Enhancements to ProSe UE-to-Network Relay(Release 15),total 10 pages.
(Continued)

*Primary Examiner* — Richard A McCoy
(74) *Attorney, Agent, or Firm* — Womble Bond Dickinson (US) LLP

(57) ABSTRACT

Embodiments of this application relate to a method and a device for protecting privacy. The method includes: sending, by a remote terminal, a first message to a mobility management entity by using a relay terminal, where the first message includes first identity information of the remote terminal, and the first message is used by the mobility management entity to obtain an international mobile subscriber identity IMSI of the remote terminal based on the first identity information of the remote terminal, where the first identity information is a proximity service relay user key identity PRUK ID. Because the first identity information is used to replace the IMSI, interception of the IMSI by the relay terminal is avoided, and user privacy is protected.

8 Claims, 10 Drawing Sheets

(51) Int. Cl.
*H04W 12/63* (2021.01)
*H04W 12/72* (2021.01)
*H04W 12/33* (2021.01)

(56) References Cited

U.S. PATENT DOCUMENTS

| | | | |
|---|---|---|---|
| 2017/0055149 | A1 | 2/2017 | Lehtovirta et al. |
| 2017/0126682 | A1* | 5/2017 | Wong .................. H04W 12/069 |
| 2018/0249319 | A1 | 8/2018 | Jin et al. |

FOREIGN PATENT DOCUMENTS

| | | |
|---|---|---|
| CN | 104618891 A | 5/2015 |
| CN | 106375390 A | 2/2017 |
| CN | 106714151 A | 5/2017 |
| JP | 6632713 B2 * 1/2020 | ............ H04W 12/04 |
| WO | 2017031661 A1 3/2017 | |
| WO | WO-2018041757 A1 * 3/2018 | ............ H04M 11/00 |

OTHER PUBLICATIONS

3GPP TS 22.278 V15.1 0 (Mar. 2017),3rd Generation Partnership Project;Technical Specification Group Services and System Aspects-;Service requirements for the Evolved Packet System (EPS)(Release 15),total 49 pages.
S2-170995 Huawei, HiSilicon,"Solution on authentication and authorization for indirect 3GPP communication",SA WG2 Meeting #119,13 Feb. 17, 2017, Dubrovnik, Croatia,total 5 pages.
S2-132865 Ericsson, ST-Ericsson,"ProSe Identities",SA WG2 Meeting S2#98,Jul. 15-19, 2013, Valencia, Spain,total 8 pages.
S3-171580 KPN,"Introduction of Key Issue on IMSI privacy in attach via eRemote UE",3GPP TSG SA WG3 (Security) Meeting #87,May 15-19, 2017, Ljubljana,Slovenia,total 2 pages.

* cited by examiner

METHOD AND DEVICE FOR PROTECTING PRIVACY

CROSS-REFERENCE TO RELATED APPLICATIONS

This application is a National Stage of International Patent Application No. PCT/CN2017/095088, filed on Jul. 30, 2017, which is herein incorporated by reference in its entirety.

TECHNICAL FIELD

Embodiments of this application relate to the field of communications technologies, and in particular, to a method and a device for protecting privacy.

BACKGROUND

The smartphone industry is already mature, and its market will soon be saturated. Access and data card markets are already on the decline. Wearable devices will be a strategic direction in the future. Currently, a wearable device such as a smartwatch in which a subscriber identity module (SIM) card may be installed has been launched in the market, so that the smartwatch can be directly connected to a network. A development trend in the future is that a wearable device is directly connected to a network.

Currently, a mobile phone with high performance usually exists near a wearable device, and the mobile phone and the wearable device communicate with a network respectively. It is expected that the wearable device can be connected to the network by using the mobile phone, to save power of the wearable device and improve transmission efficiency of the wearable device, where the mobile phone may be referred to as a relay terminal, and the wearable device is referred to as a remote terminal.

Before the remote terminal is connected to the network by using the relay terminal, the remote terminal needs to discover the relay terminal, and further, the remote terminal is attached to the network by using the relay terminal and communicates with a core network. When the core network has not allocated a temporary identity to the remote terminal, a non-access stratum (NAS) message between the remote terminal and the core network includes an international mobile subscriber identity (IMSI) of the remote terminal, and the NAS message including the IMSI is not encrypted for protection. Therefore, the IMSI of the remote terminal may be easily obtained by the relay terminal. If the relay terminal is attacked or improperly used, the relay terminal may adsorb the terminal, and perform a spoofing action such as a fraud on the remote terminal, causing an undesirable consequence to a user.

SUMMARY

This application provides a method and a device for protecting privacy, to resolve a problem in the prior art that an IMSI is easily obtained by a relay terminal and that leakage of the IMSI causes an undesirable consequence to a user.

According to a first aspect, an embodiment of this application provides a method for protecting privacy, where the method includes:

sending, by a remote terminal, a first message to a mobility management entity by using a relay terminal, where the first message includes first identity information of the remote terminal, and the first message is used by the mobility management entity to obtain an international mobile subscriber identity IMSI of the remote terminal based on the first identity information of the remote terminal, where the first identity information is a proximity service relay user key identity PRUK ID. Because the first identity information or second identity information is used to replace the IMSI, interception of the IMSI by the relay terminal is avoided, and user privacy is further protected.

In one embodiment, the remote terminal sends a first request message to the relay terminal, where the first request message is used to request to establish a communications connection between the remote terminal and the relay terminal, the first request message includes second identity information of the remote terminal, and the second identity information is used by a network device to obtain the IMSI of the remote terminal; and the remote terminal obtains, by using the relay terminal, the first identity information sent by the network device. Because the PRUK ID is used to replace the IMSI, interception of the IMSI by the relay terminal is avoided, and user privacy is further protected.

In one embodiment, the second identity information of the remote terminal is any one of the following: a mobile subscriber international identity MSISDN of the remote terminal, a temporary private identity of the remote terminal that is generated in a bootstrapping process, a bootstrapping interaction identifier B-TID of the remote terminal that is generated in a bootstrapping process, a push temporary identifier P-TID of the remote terminal that is generated in a bootstrapping push process initiated by the network device, an identity allocated by the network device for discovery, or a public identity allocated by the network device to the remote terminal. Because one of the plurality of identities is used to replace the IMSI, interception of the IMSI by the relay terminal is avoided, and user privacy is further protected.

In the method for protecting privacy according to this embodiment of this application, when the remote terminal is attached to a network by using the relay terminal, because the PRUK ID is used to replace the IMSI, interception of the IMSI by the relay terminal is avoided, and user privacy is protected.

According to a second aspect, an embodiment of this application provides a method for protecting privacy, where the method includes: receiving, by a network device, a second request message sent by a relay terminal, where the second request message includes first identity information or second identity information of a remote terminal, the second request message is sent after the relay terminal receives a first request message from the remote terminal, and the first request message is used to request to establish a communications connection between the remote terminal and the relay terminal; obtaining, by the network device, the first identity information and an international mobile subscriber identity IMSI of the remote terminal; and sending, by the network device, the first identity information and the IMSI of the remote terminal to a user data server, so that the user data server stores a correspondence between the first identity information and the IMSI of the remote terminal; or sending, by the network device, the first identity information and the IMSI of the remote terminal to a mobility management entity, so that the mobility management entity stores a correspondence between the first identity information and the IMSI of the remote terminal. The first identity information or the second identity information is used to replace the IMSI, the user data server and the mobility management entity store and update the correspondence between the first identity information and the IMSI of the remote terminal, and further, the IMSI is determined based on the identity information. Therefore, interception of the IMSI by the relay terminal is avoided, and user privacy is further protected.

In one embodiment, the network device determines the IMSI of the remote terminal based on the first identity information, thereby obtaining the first identity information and the IMSI of the remote terminal; or the network device determines the international mobile subscriber identity IMSI of the remote terminal based on the second identity information, and the network device generates the first identity information, so that the network device obtains the first identity information and the IMSI of the remote terminal. Because the first identity information is used to determine the IMSI of the remote device, interception of the IMSI by the relay terminal is avoided, and user privacy is further protected.

In one embodiment, the network device sends a third request message to the user data server, where the third request message includes the first identity information and the IMSI of the remote terminal. The third request message may enable the user data server to update the first identity information and the IMSI of the remote terminal. Therefore, obtaining the IMSI by the relay terminal is avoided.

In one embodiment, the network device sends a fourth request message to the user data server, so that the user data server sends a fifth request message to the mobility management entity, where the fourth request message includes the first identity information and the IMSI of the remote terminal, and the fifth request message includes the first identity information and the IMSI of the remote terminal. The fourth request message may enable the mobility management entity to update the first identity information and the IMSI of the remote terminal. Therefore, obtaining the IMSI by the relay terminal is avoided.

In one embodiment, the first identity information is a proximity service relay user key identity PRUK ID. Because the PRUK ID is used to replace the IMSI, interception of the IMSI by the relay terminal is avoided, and user privacy is further protected.

In one embodiment, the second identity information of the remote terminal is any one of the following: a mobile subscriber international identity MSISDN of the remote terminal, a temporary private identity of the remote terminal that is generated in a bootstrapping process, a bootstrapping interaction identifier B-TID of the remote terminal that is generated in a bootstrapping process, a push temporary identifier P-TID of the remote terminal that is generated in a bootstrapping push process initiated by the network device, an identity allocated by the network device for discovery, or a public identity allocated by the network device to the remote terminal. Because one of the plurality of identities is used to replace the IMSI, interception of the IMSI by the relay terminal is avoided, and user privacy is further protected.

In the method for protecting privacy according to this embodiment of this application, when the remote terminal is attached to a network by using the relay terminal, because the PRUK ID is used to replace the IMSI, interception of the IMSI by the relay terminal is avoided, and user privacy is protected.

According to a third aspect, an embodiment of this application provides a method for protecting privacy, where the method includes: receiving, by a mobility management entity, a first message sent by a remote terminal by using a relay terminal, where the first message includes first identity information of the remote terminal; and obtaining, by the mobility management entity, an international mobile subscriber identity IMSI of the remote terminal based on the first identity information of the remote terminal. Because the first identity information is used to replace the IMSI, interception of the IMSI by the relay terminal is avoided, and user privacy is further protected.

In one embodiment, the mobility management entity sends a first request message to a user data server, where the first request message includes the first identity information, and receives a response message returned by the user data server with respect to the first request message, where the response message includes the IMSI of the remote terminal; or the mobility management entity obtains the IMSI of the remote terminal based on a stored correspondence between the first identity information and the IMSI of the remote terminal; or the mobility management entity determines a mobility management entity to which the relay terminal belongs, sends a second request message to the mobility management entity to which the relay terminal belongs, where the second request message includes the first identity information, and receives a response message returned by the mobility management entity to which the relay terminal belongs with respect to the second request message, where the response message includes the IMSI of the remote terminal.

In one embodiment, the mobility management entity determines, based on a length of the first identity information, that identity information of the remote terminal is the first identity information; or the mobility management entity indicates, based on indication information in the first identity information, that identity information of the remote terminal is the first identity information. The mobility management entity may further determine, based on a length of the identity information, whether the identity information is the first identity information, or indicate, based on the indication information, that the identity information is the first identity information, to ensure that the identity information is the first identity information.

In one embodiment, the first identity information is a proximity service relay user key identity PRUK ID. Because the PRUK ID is used to replace the IMSI, interception of the IMSI by the relay terminal is avoided, and user privacy is further protected.

In the method for protecting privacy according to this embodiment of this application, when the remote terminal is attached to a network by using the relay terminal, because the PRUK ID is used to replace the IMSI, interception of the IMSI by the relay terminal is avoided, and user privacy is protected.

According to a fourth aspect, an embodiment of this application provides a method for protecting privacy, where the method includes: establishing, by a remote terminal, a communications connection to a relay terminal; obtaining, by the remote terminal, a root key of the remote terminal, where the root key of the remote terminal is used to protect communication between the remote terminal and the relay terminal; generating, by the remote terminal, a first key based on the root key of the remote terminal, and encrypting first information by using the first key, where the first information includes an international mobile subscriber identity IMSI of the remote terminal; and sending, by the remote terminal, a second message to a mobility management entity, where the second message includes an encrypted first message and an identity of the root key of the remote terminal. Because the IMSI is used as the first message, and the first message is encrypted by using the first key generated based on the root key, it is ensured that the relay terminal cannot obtain the IMSI. Therefore, interception of the IMSI by the relay terminal is avoided, and user privacy is protected.

In one embodiment, the remote terminal generates a second key based on the root key of the remote terminal, and performs integrity protection on at least the first information by using the second key, to generate MAC information, where the second message further includes the MAC information. Because the second key is used to perform integrity protection on at least the first information, it is ensured that the relay terminal cannot obtain the IMSI. Therefore, interception of the IMSI by the relay terminal is avoided, and user privacy is protected.

In one embodiment, the second message further includes at least one of the following: identity information of an encryption algorithm or identity information of an integrity protection algorithm used by the remote terminal. The identity information of the encryption algorithm and/or the integrity protection algorithm for the first message is added to the second message, so that the mobility management entity can decrypt and verify second information.

In one embodiment, the remote terminal sends a first request message to the relay terminal, where the first request message is used to request to establish the communications connection to the relay terminal, and the first request message includes first identity information of the remote terminal. Because the first identity information in the first request message is used to replace the IMSI, it is ensured that the relay terminal cannot obtain the IMSI. Therefore, interception of the IMSI by the relay terminal is avoided, and user privacy is protected.

In one embodiment, the first identity information is any one of the following identities: a mobile subscriber international identity MSISDN of the remote terminal, a temporary private identity of the remote terminal that is generated in a bootstrapping process, a bootstrapping interaction identifier B-TID of the remote terminal that is generated in a bootstrapping process, a push temporary identifier P-TID of the remote terminal that is generated in a bootstrapping push process initiated by the network device, an identity allocated by the network device for discovery, or a public identity allocated by the network device to the remote terminal. Because one of the plurality of identities is used to replace the IMSI, interception of the IMSI by the relay terminal is avoided, and user privacy is further protected.

In the method for protecting privacy according to this embodiment of this application, when the remote terminal is attached to a network by using the relay terminal, the remote terminal encrypts the first message and performs integrity protection on at least the first message, and then the mobility management entity performs decryption and verification. Therefore, interception of the IMSI by the relay terminal is avoided, and user privacy is protected.

According to a fifth aspect, an embodiment of this application provides a method for protecting privacy, where the method includes: receiving, by a network device, a second request message sent by a relay terminal, where the second request message includes first identity information of a remote terminal, and the second request message is used to request to obtain a root key for communicating with the remote terminal; obtaining, by the network device, a root key of the remote terminal and identity information of the root key; and sending, by the network device, the root key of the remote terminal and the identity information of the root key to a user data server, or sending, by the network device, the root key of the remote terminal and the identity information of the root key to a mobility management entity to which the relay terminal belongs. The root key for communicating with the remote terminal and an identity of the root key are obtained by using the second request message, and then the root key and the identity of the root key are sent to the mobility management entity, so that the mobility management entity generates a first key and a second key based on the identity of the root key before decrypting a second message and further decrypts and verifies second information.

In one embodiment, the network device sends, by using the user data server, the root key of the remote terminal and the identity information of the root key to the mobility management entity to which the relay terminal belongs.

In the method for protecting privacy according to this embodiment of this application, when the remote terminal is attached to a network by using the relay terminal, the remote terminal encrypts the first message and performs integrity protection on at least the first message, and then the mobility management entity performs decryption and verification. Therefore, interception of the IMSI by the relay terminal is avoided, and user privacy is protected.

According to a sixth aspect, an embodiment of this application provides a method for protecting privacy, where the method includes: receiving, by a mobility management entity, a first message sent by a remote terminal, where the first message includes encrypted first information and an identity of a root key of the remote terminal, and the first information includes an international mobile subscriber identity IMSI of the remote terminal; obtaining, by the mobility management entity, the root key of the remote terminal based on the identity of the root key of the remote terminal; and generating, by the mobility management entity, a first key based on the root key of the remote terminal, and decrypting the first information by using the first key, to obtain the IMSI of the remote terminal. Because the IMSI is used as the first message, and the first message is encrypted by using the first key generated based on the root key, it is ensured that a relay terminal cannot obtain the IMSI. Therefore, interception of the IMSI by the relay terminal is avoided, and user privacy is protected.

In one embodiment, the first message further includes MAC information, and the MAC information is generated after the remote terminal performs integrity protection on the first information; and the mobility management entity generates a second key based on the root key of the remote terminal, and verifies the MAC information by using the second key, to verify integrity of the first information. The second key is used to perform integrity protection verification on at least the first information, to determine integrity of the first information. Therefore, user privacy is protected.

In one embodiment, the first message further includes at least one of the following: identity information of an encryption algorithm or identity information of an integrity protection algorithm used by the remote terminal; and when the first message includes the identity information of the encryption algorithm, the mobility management entity decrypts the first information by using the first key and based on the encryption algorithm corresponding to the identity information of the encryption algorithm; or when the first message includes the identity information of the integrity protection algorithm, the mobility management entity verifies the MAC information by using the second key and based on the integrity protection algorithm corresponding to the identity information of the integrity protection algorithm; or when the first message includes the identity information of the encryption algorithm and the identity information of the integrity protection algorithm, the mobility management entity decrypts the first information by using the first key and based on the encryption algorithm corresponding to the identity information of the encryption algorithm, and the mobility management entity verifies the MAC information by using the second key and based on the integrity protection algorithm corresponding to the identity information of the integrity protection algorithm. The identity information of the encryption algorithm and/or the integrity protection algorithm for the first message is added to the second message, so that the mobility management entity can decrypt and verify second information.

In one embodiment, the mobility management entity sends a second request message to a user data server, where the second request message includes the identity of the root key of the remote terminal that is received in the first message, and receives a response message returned by the user data server with respect to the second request message, where the response message includes the root key of the remote terminal; or the mobility management entity determines the root key of the remote terminal based on a stored correspondence between the root key of the remote terminal and identity information of the root key of the remote terminal; or the mobility management entity determines a mobility management entity to which a relay terminal belongs, sends a third request message to the mobility management entity to which the relay terminal belongs, where the third request message includes the identity of the root key of the remote terminal that is received in the first message, and receives a response message returned by the mobility management entity to which the relay terminal belongs with respect to the third request message, where the response message includes the root key of the remote terminal.

In the method for protecting privacy according to this embodiment of this application, when the remote terminal is attached to a network by using the relay terminal, the remote terminal encrypts the first message and performs integrity protection on at least the first message, and then the mobility management entity performs decryption and verification. Therefore, interception of the IMSI by the relay terminal is avoided, and user privacy is protected.

According to a seventh aspect, an embodiment of this application provides a device for protecting privacy, where the device includes: a sending unit, configured to send a first message to a mobility management entity by using a relay terminal, where the first message includes first identity information of the remote terminal, and the first message is used by the mobility management entity to obtain an international mobile subscriber identity IMSI of the remote terminal based on the first identity information of the remote terminal, where the first identity information is a proximity service relay user key identity PRUK ID. Because the first identity information or second identity information is used to replace the IMSI, interception of the IMSI by the relay terminal is avoided, and user privacy is further protected.

In one embodiment, the sending unit is further configured to send a first request message to the relay terminal, where the first request message is used to request to establish a communications connection between the remote terminal and the relay terminal, the first request message includes second identity information of the remote terminal, and the second identity information is used by a network device to obtain the IMSI of the remote terminal; and the device further includes an obtaining unit, configured to obtain, by using the relay terminal, the first identity information sent by the network device. Because the PRUK ID is used to replace the IMSI, interception of the IMSI by the relay terminal is avoided, and user privacy is further protected.

In one embodiment, the second identity information of the remote terminal is any one of the following: a mobile subscriber international identity MSISDN of the remote terminal, a temporary private identity of the remote terminal that is generated in a bootstrapping process, a bootstrapping interaction identifier B-TID of the remote terminal that is generated in a bootstrapping process, a push temporary identifier P-TID of the remote terminal that is generated in a bootstrapping push process initiated by the network device, an identity allocated by the network device for discovery, or a public identity allocated by the network device to the remote terminal. Because one of the plurality of identities is used to replace the IMSI, interception of the IMSI by the relay terminal is avoided, and user privacy is further protected.

In the method for protecting privacy according to this embodiment of this application, when the remote terminal is attached to a network by using the relay terminal, because the PRUK ID is used to replace the IMSI, interception of the IMSI by the relay terminal is avoided, and user privacy is protected.

According to an eighth aspect, an embodiment of this application provides a method for protecting privacy, where the method includes: a receiving unit, configured to receive a second request message sent by a relay terminal, where the second request message includes first identity information or second identity information of a remote terminal, the second request message is sent after the relay terminal receives a first request message from the remote terminal, and the first request message is used to request to establish a communications connection between the remote terminal and the relay terminal; an obtaining unit, configured to obtain the first identity information and an international mobile subscriber identity IMSI of the remote terminal; and a sending unit, configured to send the first identity information and the IMSI of the remote terminal to a user data server, so that the user data server stores a correspondence between the first identity information and the IMSI of the remote terminal; or send, by the network device, the first identity information and the IMSI of the remote terminal to a mobility management entity, so that the mobility management entity stores a correspondence between the first identity information and the IMSI of the remote terminal. The first identity information or the second identity information is used to replace the IMSI, the user data server and the mobility management entity store and update the correspondence between the first identity information and the IMSI of the remote terminal, and further, the IMSI is determined based on the identity information. Therefore, interception of the IMSI by the relay terminal is avoided, and user privacy is further protected.

In one embodiment, the obtaining unit is configured to determine the IMSI of the remote terminal based on the first identity information, thereby obtaining the first identity information and the IMSI of the remote terminal; or determine the international mobile subscriber identity IMSI of the remote terminal based on the second identity information, and generate, by the network device, the first identity information, so that the network device obtains the first identity information and the IMSI of the remote terminal. Because the first identity information is used to determine the IMSI of the remote device, interception of the IMSI by the relay terminal is avoided, and user privacy is further protected.

In one embodiment, the sending unit is configured to send a third request message to the user data server, where the third request message includes the first identity information and the IMSI of the remote terminal. The third request message may enable the user data server to update the first identity information and the IMSI of the remote terminal. Therefore, obtaining the IMSI by the relay terminal is avoided.

In one embodiment, the sending unit is configured to send a fourth request message to the user data server, so that the user data server sends a fifth request message to the mobility management entity, where the fourth request message includes the first identity information and the IMSI of the remote terminal, and the fifth request message includes the first identity information and the IMSI of the remote terminal. The fourth request message may enable the mobility management entity to update the first identity information and the IMSI of the remote terminal. Therefore, obtaining the IMSI by the relay terminal is avoided.

In one embodiment, the first identity information is a proximity service relay user key identity PRUK ID. Because the PRUK ID is used to replace the IMSI, interception of the IMSI by the relay terminal is avoided, and user privacy is further protected.

In one embodiment, the second identity information of the remote terminal is any one of the following: a mobile subscriber international identity MSISDN of the remote terminal, a temporary private identity of the remote terminal that is generated in a bootstrapping process, a bootstrapping interaction identifier B-TID of the remote terminal that is generated in a bootstrapping process, a push temporary identifier P-TID of the remote terminal that is generated in a bootstrapping push process initiated by the network device, an identity allocated by the network device for discovery, or a public identity allocated by the network device to the remote terminal. Because one of the plurality of identities is used to replace the IMSI, interception of the IMSI by the relay terminal is avoided, and user privacy is further protected.

In the method for protecting privacy according to this embodiment of this application, when the remote terminal is attached to a network by using the relay terminal, because the PRUK ID is used to replace the IMSI, interception of the IMSI by the relay terminal is avoided, and user privacy is protected.

According to a ninth aspect, an embodiment of this application provides a device for protecting privacy, where the device includes: a receiving unit, configured to receive a first message sent by a remote terminal by using a relay terminal, where the first message includes first identity information of the remote terminal; and an obtaining unit, configured to obtain an international mobile subscriber identity IMSI of the remote terminal based on the first identity information of the remote terminal. Because the first identity information is used to replace the IMSI, interception of the IMSI by the relay terminal is avoided, and user privacy is further protected.

In one embodiment, a sending unit is configured to send a first request message to a user data server, where the first request message includes the first identity information; and the receiving unit is further configured to receive a response message returned by the user data server with respect to the first request message, where the response message includes the IMSI of the remote terminal; or the obtaining unit is configured to obtain the IMSI of the remote terminal based on a stored correspondence between a first identity of the remote terminal and the IMSI of the remote terminal; or the sending unit is further configured to determine a mobility management entity to which the relay terminal belongs, and send a second request message to the mobility management entity to which the relay terminal belongs, where the second request message includes the first identity information, and the receiving unit is further configured to receive a response message returned by the mobility management entity to which the relay terminal belongs with respect to the second request message, where the response message includes the IMSI of the remote terminal.

In one embodiment, a determining unit is configured to determine, based on a length of the first identity information, that identity information of the remote terminal is the first identity information; or an indication unit is configured to indicate, based on indication information in the first identity information, that identity information of the remote terminal is the first identity information. The mobility management entity may further determine, based on a length of the identity information, whether the identity information is the first identity information, or indicate, based on the indication information, that the identity information is the first identity information, to ensure that the identity information is the first identity information.

In one embodiment, the first identity information is a proximity service relay user key identity PRUK ID. Because the PRUK ID is used to replace the IMSI, interception of the IMSI by the relay terminal is avoided, and user privacy is further protected.

In the method for protecting privacy according to this embodiment of this application, when the remote terminal is attached to a network by using the relay terminal, because the PRUK ID is used to replace the IMSI, interception of the IMSI by the relay terminal is avoided, and user privacy is protected.

According to a tenth aspect, an embodiment of this application provides an apparatus for protecting privacy, where the apparatus includes: a communications connection unit, configured to establish a communications connection to a relay terminal; an obtaining unit, configured to obtain a root key of the remote terminal, where the root key of the remote terminal is used to protect communication between the remote terminal and the relay terminal; a generation and encryption unit, configured to generate a first key based on the root key of the remote terminal, and encrypt first information by using the first key, where the first information includes an international mobile subscriber identity IMSI of the remote terminal; and a sending unit, configured to send a second message to a mobility management entity, where the second message includes an encrypted first message and an identity of the root key of the remote terminal. Because the IMSI is used as the first message, and the first message is encrypted by using the first key generated based on the root key, it is ensured that the relay terminal cannot obtain the IMSI. Therefore, interception of the IMSI by the relay terminal is avoided, and user privacy is protected.

In one embodiment, the generation and encryption unit is further configured to generate a second key based on the root key of the remote terminal, and perform integrity protection on the first information by using the second key, to generate MAC information, where the second message further includes the MAC information. Because the second key is used to perform integrity protection on at least the first information, it is ensured that the relay terminal cannot obtain the IMSI. Therefore, interception of the IMSI by the relay terminal is avoided, and user privacy is protected.

In one embodiment, the second message further includes at least one of the following: identity information of an encryption algorithm or identity information of an integrity protection algorithm used by the remote terminal. The identity information of the encryption algorithm and/or the integrity protection algorithm for the first message is added to the second message, so that the mobility management entity can decrypt and verify second information.

In one embodiment, the communications connection unit is configured to send a first request message to the relay terminal, where the first request message is used to request to establish the communications connection to the relay terminal, and the first request message includes first identity information of the remote terminal. Because the first identity information in the first request message is used to replace the IMSI, it is ensured that the relay terminal cannot obtain the IMSI. Therefore, interception of the IMSI by the relay terminal is avoided, and user privacy is protected.

In one embodiment, the first identity information is any one of the following identities: a mobile subscriber international identity MSISDN of the remote terminal, a temporary private identity of the remote terminal that is generated in a bootstrapping process, a bootstrapping interaction identifier B-TID of the remote terminal that is generated in a bootstrapping process, a push temporary identifier P-TID of the remote terminal that is generated in a bootstrapping push process initiated by the network device, an identity allocated by the network device for discovery, or a public identity allocated by the network device to the remote terminal. Because one of the plurality of identities is used to replace the IMSI, interception of the IMSI by the relay terminal is avoided, and user privacy is further protected.

In the method for protecting privacy according to this embodiment of this application, when the remote terminal is attached to a network by using the relay terminal, the remote terminal encrypts the first message and performs integrity protection on at least the first message, and then the mobility management entity performs decryption and verification. Therefore, interception of the IMSI by the relay terminal is avoided, and user privacy is protected.

According to an eleventh aspect, an embodiment of this application provides a device for protecting privacy, where the device includes: a receiving unit, configured to receive a second request message sent by a relay terminal, where the second request message includes first identity information of a remote terminal, and the second request message is used to request to obtain a root key for communicating with the remote terminal; an obtaining unit, configured to obtain a root key of the remote terminal and identity information of the root key; and a sending unit, configured to send the root key of the remote terminal and the identity information of the root key to a user data server, or send, by the network device, the root key of the remote terminal and the identity information of the root key to a mobility management entity to which the relay terminal belongs. The root key for communicating with the remote terminal and an identity of the root key are obtained by using the second request message, and then the root key and the identity of the root key are sent to the mobility management entity, so that the mobility management entity generates a first key and a second key based on the identity of the root key before decrypting a second message and further decrypts and verifies second information.

In one embodiment, the sending unit is configured to send, by the network device by using the user data server, the root key of the remote terminal and the identity information of the root key to the mobility management entity to which the relay terminal belongs.

In the method for protecting privacy according to this embodiment of this application, when the remote terminal is attached to a network by using the relay terminal, the remote terminal encrypts the first message and performs integrity protection on at least the first message, and then the mobility management entity performs decryption and verification. Therefore, interception of the IMSI by the relay terminal is avoided, and user privacy is protected.

According to a twelfth aspect, an embodiment of this application provides a device for protecting privacy, where the device includes: a receiving unit, configured to receive a first message sent by a remote terminal, where the first message includes encrypted first information and an identity of a root key of the remote terminal, and the first information includes an international mobile subscriber identity IMSI of the remote terminal; an obtaining unit, configured to obtain the root key of the remote terminal based on the identity of the root key of the remote terminal; and a generation and decryption unit, configured to generate a first key based on the root key of the remote terminal, and decrypt the first information by using the first key, to obtain the IMSI of the remote terminal. Because the IMSI is used as the first message, and the first message is encrypted by using the first key generated based on the root key, it is ensured that a relay terminal cannot obtain the IMSI. Therefore, interception of the IMSI by the relay terminal is avoided, and user privacy is protected.

In one embodiment, the first message further includes MAC information, and the MAC information is generated after the remote terminal performs integrity protection on the first information; and the generation and decryption unit is further configured to generate a second key based on the root key of the remote terminal, and verify the MAC information by using the second key, to verify integrity of the first information. The second key is used to perform integrity protection verification on at least the first information, to determine integrity of the first information. Therefore, user privacy is protected.

In one embodiment, the first message further includes at least one of the following: identity information of an encryption algorithm or identity information of an integrity protection algorithm used by the remote terminal; and when the first message includes the identity information of the encryption algorithm, the generation and decryption unit is further configured to decrypt the first information by using the first key and based on the encryption algorithm corresponding to the identity information of the encryption algorithm; or when the first message includes the identity information of the integrity protection algorithm, the generation and decryption unit is further configured to verify the MAC information by using the second key and based on the integrity protection algorithm corresponding to the identity information of the integrity protection algorithm; or when the first message includes the identity information of the encryption algorithm and the identity information of the integrity protection algorithm, the generation and decryption unit is further configured to decrypt the first information by using the first key and based on the encryption algorithm corresponding to the identity information of the encryption algorithm, and verify, by the mobility management entity, the MAC information by using the second key and based on the integrity protection algorithm corresponding to the identity information of the integrity protection algorithm. The identity information of the encryption algorithm or the integrity protection algorithm for the first message is added to the second message, so that the mobility management entity can decrypt and verify second information.

In one embodiment, the obtaining unit is configured to: send a second request message to a user data server, where the second request message includes the identity of the root key of the remote terminal that is received in the first message, and receive a response message returned by the user data server with respect to the second request message, where the response message includes the root key of the remote terminal; or determine the root key of the remote terminal based on a stored correspondence between the root key of the remote terminal and identity information of the root key of the remote terminal; or determine a mobility management entity to which a relay terminal belongs, send a third request message to the mobility management entity to which the relay terminal belongs, where the third request message includes the identity of the root key of the remote terminal that is received in the first message, and receive a response message returned by the mobility management entity to which the relay terminal belongs with respect to the third request message, where the response message includes the root key of the remote terminal.

In the method for protecting privacy according to this embodiment of this application, when the remote terminal is attached to a network by using the relay terminal, the remote terminal encrypts the first message and performs integrity protection on at least the first message, and then the mobility management entity performs decryption and verification. Therefore, interception of the IMSI by the relay terminal is avoided, and user privacy is protected.

According to a thirteenth aspect, an embodiment of this application provides a device for protecting privacy, where the device includes a processor, a memory, and a transceiver, where the transceiver is configured to send a first message to a mobility management entity by using a relay terminal, where the first message includes first identity information of the remote terminal, and the first message is used by the mobility management entity to obtain an international mobile subscriber identity IMSI of the remote terminal based on the first identity information of the remote terminal, where the first identity information is a proximity service relay user key identity PRUK ID.

In one embodiment, the transceiver is further configured to send a first request message to the relay terminal, where the first request message is used to request to establish a communications connection between the remote terminal and the relay terminal, the first request message includes second identity information of the remote terminal, and the second identity information is used by a network device to obtain the IMSI of the remote terminal; and the processor is configured to obtain, by using the relay terminal, the first identity information sent by the network device.

In one embodiment, the second identity information of the remote terminal is any one of the following: a mobile subscriber international identity MSISDN of the remote terminal, a temporary private identity of the remote terminal that is generated in a bootstrapping process, a bootstrapping interaction identifier B-TID of the remote terminal that is generated in a bootstrapping process, a push temporary identifier P-TID of the remote terminal that is generated in a bootstrapping push process initiated by the network device, an identity allocated by the network device for discovery, or a public identity allocated by the network device to the remote terminal.

According to a fourteenth aspect, an embodiment of this application provides a device for protecting privacy, where the device includes a processor, a memory, and a transceiver, where the transceiver is configured to receive a second request message sent by a relay terminal, where the second request message includes first identity information or second identity information of a remote terminal, the second request message is sent after the relay terminal receives a first request message from the remote terminal, and the first request message is used to request to establish a communications connection between the remote terminal and the relay terminal;

the processor is configured to obtain the first identity information and an international mobile subscriber identity IMSI of the remote terminal; and the transceiver is further configured to send the first identity information and the IMSI of the remote terminal to a user data server, so that the user data server stores a correspondence between the first identity information and the IMSI of the remote terminal; or send, by the network device, the first identity information and the IMSI of the remote terminal to a mobility management entity, so that the mobility management entity stores a correspondence between the first identity information and the IMSI of the remote terminal.

In one embodiment, the processor is configured to determine the IMSI of the remote terminal based on the first identity information, thereby obtaining the first identity information and the IMSI of the remote terminal; or determine the international mobile subscriber identity IMSI of the remote terminal based on the second identity information, and generate, by the network device, the first identity information, so that the network device obtains the first identity information and the IMSI of the remote terminal.

In one embodiment, the sending unit is configured to send a third request message to the user data server, where the third request message includes the first identity information and the IMSI of the remote terminal.

In one embodiment, the transceiver is configured to send a fourth request message to the user data server, so that the user data server sends a fifth request message to the mobility management entity, where the fourth request message includes the first identity information and the IMSI of the remote terminal, and the fifth request message includes the first identity information and the IMSI of the remote terminal.

In one embodiment, the first identity information of the remote terminal is a proximity service relay user key identity PRUK ID.

In one embodiment, the second identity information of the remote terminal is any one of the following: a mobile subscriber international identity MSISDN of the remote terminal, a temporary private identity of the remote terminal that is generated in a bootstrapping process, a bootstrapping interaction identifier B-TID of the remote terminal that is generated in a bootstrapping process, a push temporary identifier P-TID of the remote terminal that is generated in a bootstrapping push process initiated by the network device, an identity allocated by the network device for discovery, or a public identity allocated by the network device to the remote terminal.

According to a fifteenth aspect, an embodiment of this application provides a device for protecting privacy, where the device includes a processor, a memory, and a transceiver, where the transceiver is configured to receive a first message sent by a remote terminal by using a relay terminal, where the first message includes first identity information of the remote terminal; and the processor is configured to obtain an international mobile subscriber identity IMSI of the remote terminal based on the first identity information of the remote terminal.

In one embodiment, the transceiver is further configured to send a first request message to a user data server, where the first request message includes the first identity information, and receive a response message returned by the user data server with respect to the first request message, where the response message includes the IMSI of the remote terminal; or the processor is configured to obtain the IMSI of the remote terminal based on a stored correspondence between the first identity information and the IMSI of the remote terminal; or the transceiver is further configured to determine a mobility management entity to which the relay terminal belongs, send a second request message to the mobility management entity to which the relay terminal belongs, where the second request message includes the first identity information, and receive a response message returned by the mobility management entity to which the relay terminal belongs with respect to the second request message, where the response message includes the IMSI of the remote terminal.

In one embodiment, the processor is further configured to determine, based on a length of the first identity information, that identity information of the remote terminal is the first identity information; or indicate, based on indication information in the first identity information, that identity information of the remote terminal is the first identity information.

In one embodiment, the first identity information is a proximity service relay user key identity PRUK ID.

According to a sixteenth aspect, an embodiment of this application provides a device for protecting privacy, where the device includes a processor, a memory, and a transceiver, where the processor is configured to establish a communications connection to a relay terminal; obtain a root key of the remote terminal, where the root key of the remote terminal is used to protect communication between the remote terminal and the relay terminal; and generate a first key based on the root key of the remote terminal, and encrypt first information by using the first key, where the first information includes an international mobile subscriber identity IMSI of the remote terminal; and the transceiver is configured to send a second message to a mobility management entity, where the second message includes an encrypted first message and an identity of the root key of the remote terminal.

In one embodiment, the processor is further configured to generate a second key based on the root key of the remote terminal, and perform integrity protection on the first information by using the second key, to generate MAC information, where the second message further includes the MAC information.

In one embodiment, the second message further includes at least one of the following: identity information of an encryption algorithm or identity information of an integrity protection algorithm used by the remote terminal.

In one embodiment, the transceiver is further configured to send a first request message to the relay terminal, where the first request message is used to request to establish the communications connection to the relay terminal, and the first request message includes first identity information of the remote terminal.

In one embodiment, the first identity information is any one of the following identities: a mobile subscriber international identity MSISDN of the remote terminal, a temporary private identity of the remote terminal that is generated in a bootstrapping process, a bootstrapping interaction identifier B-TID of the remote terminal that is generated in a bootstrapping process, a push temporary identifier P-TID of the remote terminal that is generated in a bootstrapping push process initiated by the network device, an identity allocated by the network device for discovery, or a public identity allocated by the network device to the remote terminal.

According to a seventeenth aspect, an embodiment of this application provides a device for protecting privacy, where the device includes a processor, a memory, and a transceiver, where the transceiver is configured to receive a second request message sent by a relay terminal, where the second request message includes first identity information of a remote terminal, and the second request message is used to request to obtain a root key for communicating with the remote terminal;

the processor is configured to obtain a root key of the remote terminal and identity information of the root key; and the transceiver is further configured to send the root key of the remote terminal and the identity information of the root key to a user data server, or send, by the network device, the root key of the remote terminal and the identity information of the root key to a mobility management entity to which the relay terminal belongs.

In one embodiment, the transceiver is further configured to send, by the network device by using the user data server, the root key of the remote terminal and the identity information of the root key to the mobility management entity to which the relay terminal belongs.

According to an eighteenth aspect, an embodiment of this application provides a device for protecting privacy, where the device includes a processor, a memory, and a transceiver, where the transceiver is configured to receive a first message sent by a remote terminal, where the first message includes encrypted first information and an identity of a root key of the remote terminal, and the first information includes an international mobile subscriber identity IMSI of the remote terminal; and the processor is configured to obtain the root key of the remote terminal based on the identity of the root key of the remote terminal, generate a first key based on the root key of the remote terminal, and decrypt the first information by using the first key, to obtain the IMSI of the remote terminal.

In one embodiment, the first message further includes MAC information, and the MAC information is generated after the remote terminal performs integrity protection on the first information; and the processor is further configured to generate a second key based on the root key of the remote terminal, and verify the MAC information by using the second key, to verify integrity of the first information.

In one embodiment, the first message further includes at least one of the following: identity information of an encryption algorithm or identity information of an integrity protection algorithm used by the remote terminal; and when the first message includes the identity information of the encryption algorithm, the processor is further configured to decrypt the first information by using the first key and based on the encryption algorithm corresponding to the identity information of the encryption algorithm; or when the first message includes the identity information of the integrity protection algorithm, the processor is further configured to verify the MAC information by using the second key and based on the integrity protection algorithm corresponding to the identity information of the integrity protection algorithm; or when the first message includes the identity information of the encryption algorithm and the identity information of the integrity protection algorithm, the processor is further configured to decrypt the first information by using the first key and based on the encryption algorithm corresponding to the identity information of the encryption algorithm, and verify, by the mobility management entity, the MAC information by using the second key and based on the integrity protection algorithm corresponding to the identity information of the integrity protection algorithm.

In one embodiment, the transceiver is configured to send a second request message to a user data server, where the second request message includes the identity of the root key of the remote terminal that is received in the first message, and receive a response message returned by the user data server with respect to the second request message, where the response message includes the root key of the remote terminal; or the processor is configured to determine the root key of the remote terminal based on a stored correspondence between the root key of the remote terminal and identity information of the root key of the remote terminal; or the processor is configured to determine a mobility management entity to which a relay terminal belongs, the transceiver sends a third request message to the mobility management entity to which the relay terminal belongs, where the third request message includes the identity of the root key of the remote terminal that is received in the first message, and the transceiver receives a response message returned by the mobility management entity to which the relay terminal belongs with respect to the third request message, where the response message includes the root key of the remote terminal.

According to a nineteenth aspect, an embodiment of this application provides a computer program product including an instruction, where when the instruction is run on a computer, the computer is enabled to perform the method according to the first aspect, the second aspect, the third aspect, the fourth aspect, the fifth aspect, or the sixth aspect.

According to a twentieth aspect, an embodiment of this application provides a computer-readable storage medium, where the computer-readable storage medium stores a computer program, and when the computer program is executed by a processor, the processor implements the method according to the first aspect, the second aspect, the third aspect, the fourth aspect, the fifth aspect, or the sixth aspect.

In the methods for protecting privacy according to the embodiments of this application, when the remote terminal is attached to the network by using the relay terminal, because the PRUK ID is used to replace the IMSI, interception of the IMSI by the relay terminal is avoided, and user privacy is protected; or because encryption and integrity protection are performed on the message sent by the remote terminal, and then the mobility management entity performs decryption and verification, interception of the IMSI of the remote terminal by the relay terminal is avoided, and user privacy is protected.

DESCRIPTION OF EMBODIMENTS

The following describes the embodiments of the present invention with reference to the accompanying drawings in the embodiments of the present invention.

Figure 1:
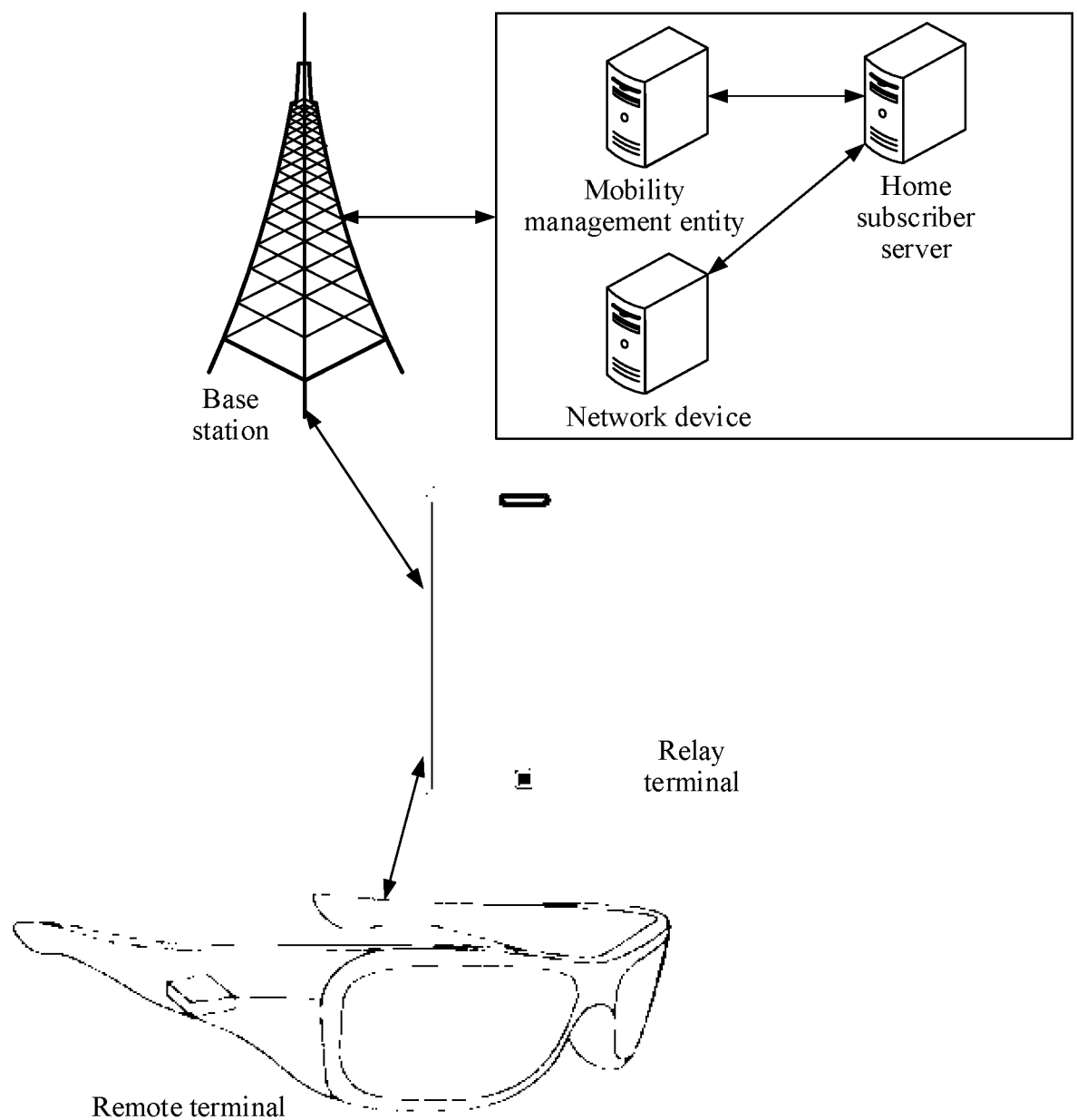
FIG. 1 is a schematic diagram of a system in which a remote terminal accesses a network by using a relay terminal according to an embodiment of this application.

FIG. 1 is a schematic diagram of a system in which a remote terminal accesses a network by using a relay terminal according to an embodiment of this application. The remote terminal establishes a short-range communications connection to the relay terminal. The remote terminal may be attached to the network by using the relay terminal. Then the remote terminal may further interact with a network device, a core network device, and the like by using the relay terminal, and is further attached to the network by using a relay network. The short-range communications connection may be a connection mode such as Bluetooth or Wi-Fi, or may be another short-range communications connection mode. This is not limited in this application.

The remote terminal may be a wearable device, for example, a smartwatch, a smart band, or a pair of smart glasses. The first terminal may include terminals in LTE and 5G scenarios.

The relay terminal may include terminals in LTE and 5G scenarios, for example, a terminal such as a mobile phone, a mobile phone, a tablet personal computer (TPC), a laptop computer, a digital camera, a digital camera, a projection device, a wearable device, a personal digital assistant (PDA), an e-book reader, a virtual reality intelligent device, a digital broadcast terminal, a message receiving/transmitting device, a game console, a medical device, a fitness device, or a scanner.

The network device may be a device providing a proximity service (Prose) for the remote terminal and the relay terminal, for example, a proximity service key management function (PKMF) entity, or a proximity service function (Prose function) device, or a functional entity integrating a PKMF entity and a Prose function entity; or the network device may be an application server of another type.

The core network device may be a mobility management entity or a user data server. The mobility management entity may be a mobility management entity (MME) in a 4G network, or may be a device responsible for mobility management in a 5G network, for example, an access and mobility management entity (AMF). The user data server may be a home subscriber server (HSS) in the 4G network, or may be a device responsible for storing user data in the 5G network, for example, unified data management (UDM).

In the embodiments of this application, the mobility management entity MME in the 4G network and the home subscriber server HSS in the 4G network are used as examples for description.

It should be noted that, "first", "second", and "third" in "first request message", "second request message", "third request message", "fourth request message", "fifth request message", "first identity information", "second identity information", "first message", and "second message" in the descriptions of the following embodiments are used for distinguishing the request messages, identities, or messages, instead of limiting the request messages, identities, or messages.

In the embodiments of this application, the remote terminal may be referred to as remote user equipment, remote UE or eRemote UE for short, and the relay terminal may be referred to as relay user equipment, relay UE or eRelay UE for short.

Privacy protection may be implemented by using two solutions in the embodiments of this application. Solution 1: In a process of establishing communication between the remote terminal and the relay terminal, a proximity service relay user key identity (PRUK ID) is used to replace an IMSI. Solution 2: A proximity service relay user key PRUK of the remote terminal is used to generate keys for encryption and integrity protection of an IMSI (Key_int_IMSI, and Key_enc_IMSI), to perform encryption and integrity protection on the IMSI of the remote terminal.

Figure 2:
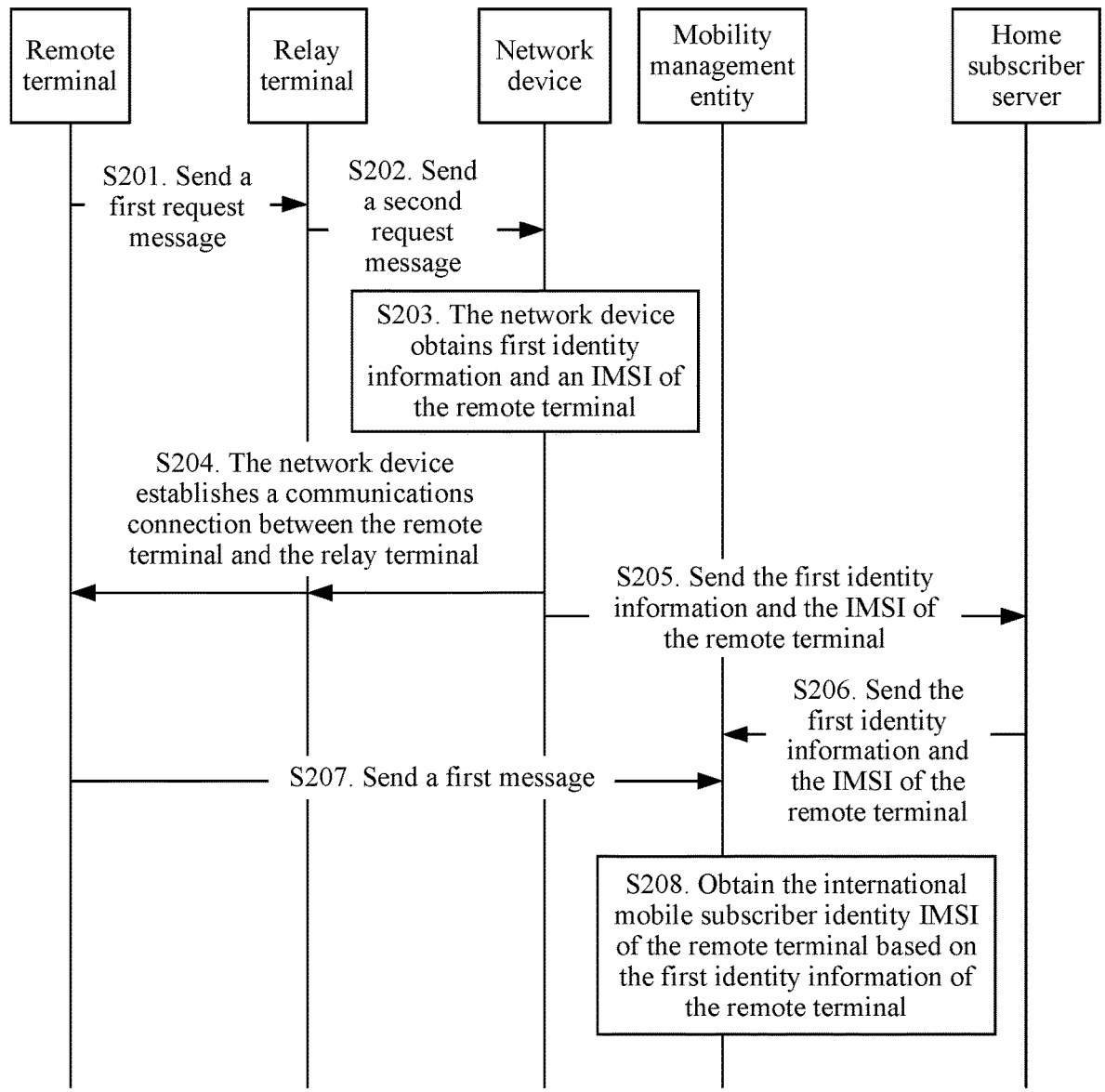
FIG. 2 is a signaling interaction diagram of a method for protecting privacy according to an embodiment of this application.

FIG. 2 is a signaling interaction diagram of a method for protecting privacy according to an embodiment of this application. As shown in FIG. 2, the method may include the following operations.

S201. A remote terminal sends a first request message to a relay terminal.

After eRemote UE discovers eRelay UE, the eRemote UE sends a first request message to the eRelay UE, where the first request message may be a direct communication request message, to request to establish a communications connection between the eRemote UE and the eRelay UE. The first request message includes first identity information or second identity information of the eRemote UE.

In an optional solution of this embodiment of this application, the first identity information may be but is not limited to: a proximity service relay user key identity (PRUK ID) of the eRemote UE, where a proximity service relay user key of the remote terminal is a root key of the remote terminal, and is allocated by a network device for generating a root key for communicating with the relay terminal, and protecting security of communication between the remote terminal and the relay terminal.

In an optional solution of this embodiment of this application, the second identity information may be but is not limited to: a mobile subscriber international identity (MSISDN) of the eRemote UE, a temporary private identity of the eRemote UE that is generated in a bootstrapping process, a bootstrapping interaction identifier B-TID of the eRemote UE that is generated in a bootstrapping process, a push temporary identifier P-TID of the eRemote UE that is generated in a bootstrapping push process initiated by the network device, an identity allocated by the network device for discovery, or a public identity allocated by the network device to the eRemote UE, where the second identity information may be any one of the foregoing identities.

S202. The relay terminal sends a second request message to the network device.

After the eRelay UE receives the first request message sent by the eRemote UE, the eRelay UE sends a second request message to the network device, where the second request message includes the first identity information or the second identity information of the eRemote UE, and the first identity information or the second identity information of the eRemote UE is obtained from the first request message.

In this embodiment, the second request message may be a key request message.

S203. The network device obtains first identity information and an IMSI of the remote terminal.

In an optional solution of this embodiment of this application, if identity information of the eRemote UE is the first identity information (PRUK ID), information of the eRemote UE that is stored by the network device includes the first identity information and an IMSI. In this case, the network device determines the IMSI of the eRemote UE based on a stored correspondence between the first identity information and the eRemote UE, to obtain the first identity information and the IMSI of the eRemote UE.

In an optional solution of this embodiment of this application, if identity information of the eRemote UE is the second identity information, the network device determines an IMSI of the eRemote UE based on the second identity information. For example, the network device may request to obtain the IMSI of the eRemote UE from a bootstrapping server function (BSF); and the BSF returns the IMSI of the eRemote UE to the network device based on a correspondence between the second identity information and the IMSI of the eRemote UE; or the network device may obtain the IMSI of the eRemote UE based on a correspondence that is between a second identity and the IMSI and is stored by the network device. Further, the network device performs a bootstrapping process in a push mode based on the IMSI of the eRemote UE. The network device generates the push process temporary identifier P-TID, and obtains GPI of the eRemote UE and a Ks(_int/ext)_NAF from the BSF; or the network device locally generates GPI and a Ks(_int/ext)_NAF after obtaining an authentication vector from an HSS, where the Ks(_int/ext)_NAF is a key generated based on a universal bootstrapping process in the push mode and used for communicating with the network device. The network device uses the obtained Ks(_int/ext)_NAF as the PRUK of the remote terminal, and uses the P-TID as the PRUK ID, that is, the first identity information. Therefore, the network device obtains the first identity information and the IMSI of the eRemote UE.

In an optional solution of this embodiment of this application, when the second identity information is the B-TID or the P-TID, the network device determines an IMSI of the eRemote UE based on the second identity information. For example, the network device may request to obtain the IMSI of the eRemote UE from a bootstrapping server function (BSF); and the BSF returns the IMSI of the eRemote UE to the network device based on a correspondence between the second identity information and the IMSI of the eRemote UE; or the network device may obtain the IMSI of the eRemote UE based on a correspondence that is between a second identity and the IMSI and is stored by the network device. The network device uses a Ks(_int/ext)_NAF corresponding to the B-TID or the P-TID as the PRUK, and uses the B-TID or the P-TID as the first identity information, where the first identity information is the PRUK ID. Therefore, the network device obtains the first identity information and the IMSI of the eRemote UE.

S204. The network device establishes a communications connection between the remote terminal and the relay terminal.

The network device generates, based on the obtained PRUK of the eRemote UE, a root key used for communication between the eRemote UE and the eRelay UE, and transmits the root key to the eRelay UE, to assist in establishing a communications connection between the remote terminal and the relay terminal. This process is based on the prior art, and is not described herein.

S205. The network device sends the first identity information and the IMSI of the remote terminal to the HSS.

The network device sends a third request message to the home subscriber server HSS, where the third request message includes the first identity information and the IMSI of the eRemote UE.

S206. The network device sends the first identity information and the IMSI of the remote terminal to a mobility management entity.

Specifically, the network device sends a fourth request message to the HSS, so that the HSS sends a fifth request message to the mobility management entity, where the fourth request message includes the first identity information and the IMSI of the eRemote UE, and the fifth request message includes the first identity information and the IMSI of the eRemote UE.

It should be noted that, S205 and S206 are two optional operations. To be specific, either S205 or S206 may be selected as a operation implemented in this application, and the following operation is performed.

S207. The mobility management entity receives a first message sent by the remote terminal by using the relay terminal.

The first message includes the first identity information of the eRemote UE.

The first message may be an attach message sent by the eRemote UE, or an identity response message returned by the eRemote UE in response to an identity request of the mobility management entity. When the eRemote UE needs to use the IMSI as the identity of the eRemote UE, to hide the IMSI, the eRemote UE should use the first identity information as the identity of the eRemote UE.

In one embodiment, to indicate that the identity of the eRemote UE is the first identity information, the identity of the eRemote UE includes indication information indicating that the identity is the first identity information, for example, 2 bits before the first identity information, where 01 indicates that the identity of the eRemote UE is the first identity information.

S208. The mobility management entity obtains the international mobile subscriber identity IMSI of the remote terminal based on the first identity information of the remote terminal.

In an optional solution of this embodiment of this application, the mobility management entity sends a sixth request message to the home subscriber server HSS, where the sixth request message includes the first identity information, and receives a response message returned by the HSS with respect to the sixth request message, where the response message includes the IMSI of the eRemote UE. Specifically, the sixth request message may be an authentication data request message, and the response message is an authentication data response message.

In an optional solution of this embodiment of this application, the mobility management entity obtains the IMSI of the eRemote UE based on a stored correspondence between a first identity of the eRemote UE and the IMSI of the eRemote UE. The mobility management entity may store the correspondence between the first identity of the eRemote UE and the IMSI of the eRemote UE by performing operation S106. When the first message is an attach message, because the eRemote UE is attached to a network for the first time by using the eRemote UE, an eNB of the eRelay UE routes the attach message to a mobility management entity to which the eRelay UE belongs. Therefore, the mobility management entity obtains the IMSI of the eRemote UE based on the stored correspondence between the first identity of the eRemote UE and the IMSI of the eRemote UE.

In an optional solution of this embodiment of this application, the mobility management entity determines a mobility management entity to which the eRelay UE belongs, sends a seventh request message to the mobility management entity to which the eRelay UE belongs, where the seventh request message includes the first identity information, and receives a response message returned by the mobility management entity to which the eRelay UE belongs with respect to the seventh request message, where the response message includes the IMSI of the eRemote UE. When the first message is an attach message, the attach message of the eRemote UE is not routed to the mobility management entity to which the eRelay UE belongs, but another mobility management entity is selected as a mobility management entity of the eRemote UE. In this case, the mobility management entity should obtain an identity of the eRelay UE by using the attach message or an S1-AP protocol message, determine the mobility management entity to which the eRelay UE belongs, and obtain the IMSI of the eRemote UE from the mobility management entity to which the eRelay UE belongs. Specifically, how the mobility management entity obtains the identity of the eRelay UE is not within the range of this idea.

In this application, an implementation solution to storing the correspondence between the first identity information of the eRemote UE and the IMSI of the eRemote UE by the HSS and the mobility management entity is not limited. For example, the HSS may store the correspondence in data of the eRemote UE, and the mobility management entity may store the correspondence in a context of the eRemote UE, or may store the correspondence in a context of the eRelay UE when receiving the identity of the eRelay UE.

The mobility management entity or the HSS may determine, based on the indication information, that the identity of the eRemote UE is the first identity, or in one embodiment, may further learn, based on a length of the first identity, that the identity of the eRemote UE is the first identity. For example, a length of the PRUK ID is 64 bits, and is different from a length of the IMSI.

In the method for protecting privacy according to this embodiment of this application, when the remote terminal is attached to the network by using the relay terminal, because the PRUK ID is used to replace the IMSI, interception of the IMSI by the relay terminal is avoided, and user privacy is protected.

Figure 3A:
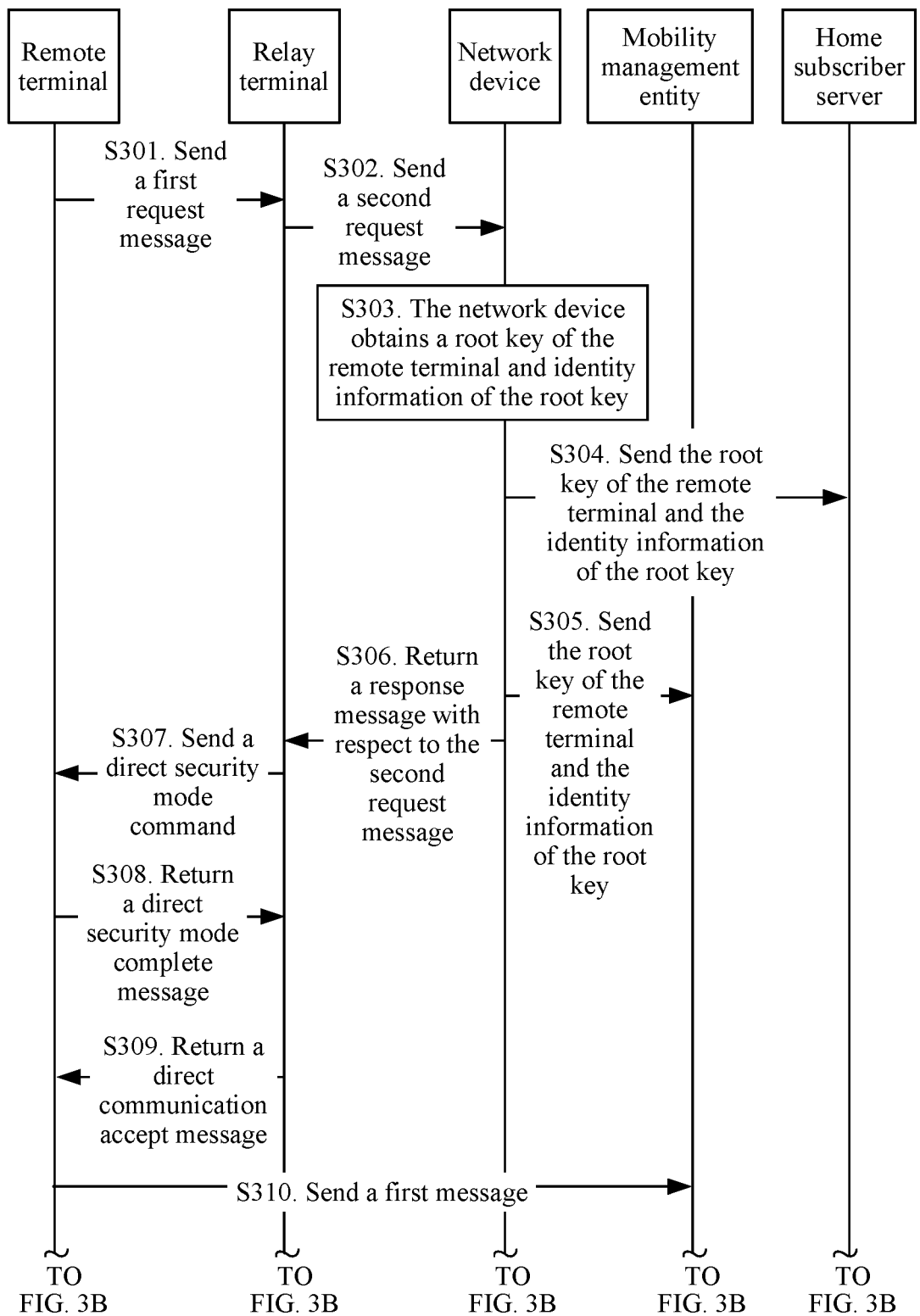
FIG. 3A and FIG. 3B are another signaling interaction diagram of a method for protecting privacy according to an embodiment of this application.
Figure 3B:
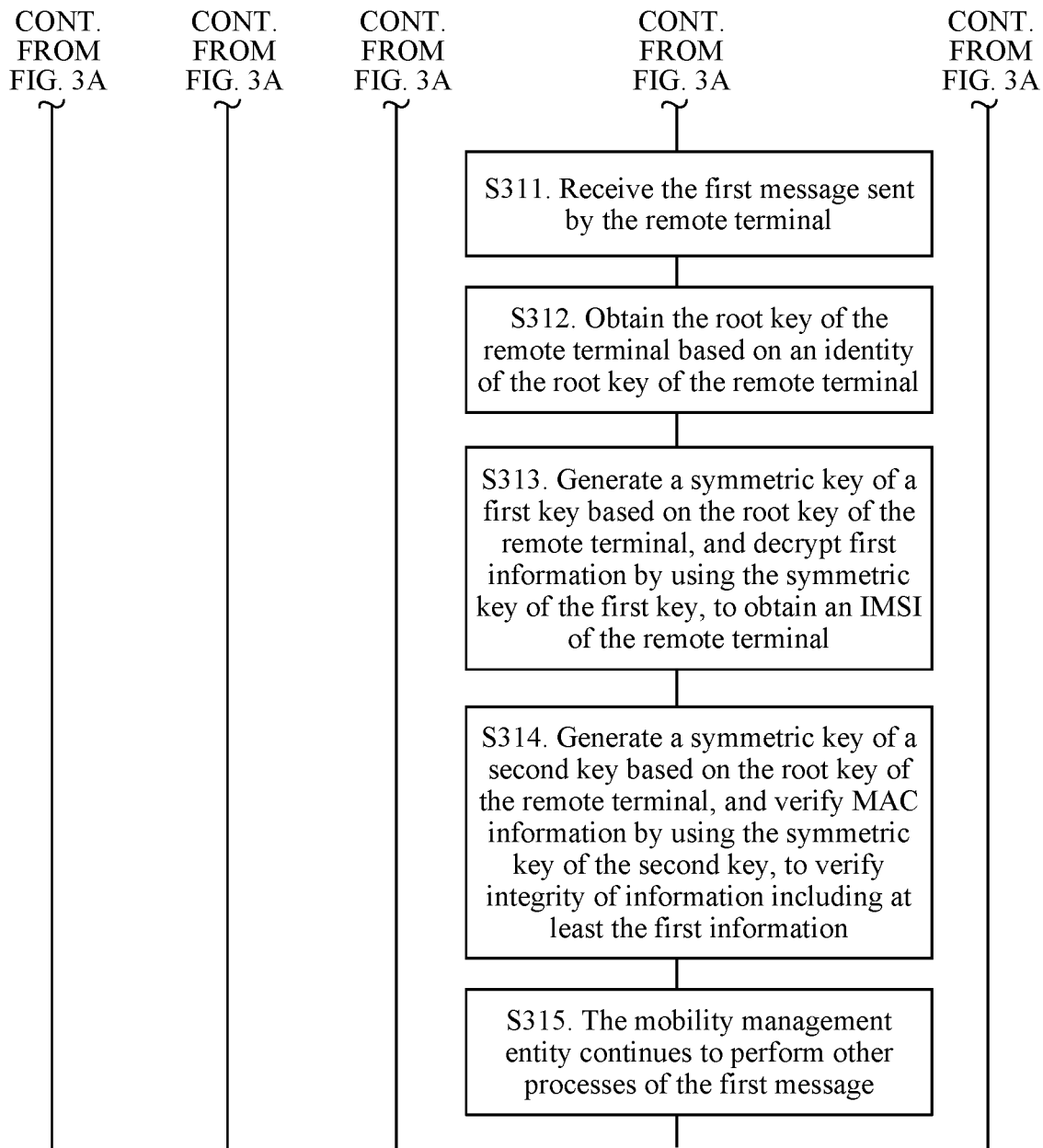

FIG. 3A and FIG. 3B are another signaling interaction diagram of a method for protecting privacy according to an embodiment of this application. As shown in FIG. 3A and FIG. 3B, the method may include the following operations.

S301. A remote terminal sends a first request message to a relay terminal.

After eRemote UE discovers eRelay UE, the eRemote UE sends a first request message to the eRelay UE, where the first request message may be a direct communication request message, to request to establish a communications connection between the eRemote UE and the eRelay UE, and the first request message includes identity information of the eRemote UE.

The identity information may be but is not limited to: a PRUK ID of the eRemote UE, an MSISDN of the eRemote UE, a temporary private identity of the eRemote UE that is generated in a bootstrapping process, a bootstrapping interaction identifier B-TID of the eRemote UE that is generated in a bootstrapping process, a push temporary identifier P-TID of the eRemote UE that is generated in a bootstrapping push process initiated by a network device, an identity allocated by a network device for discovery, or a public identity allocated by a network device to the eRemote UE, where first identity information may be any one of the foregoing identities.

S302. The relay terminal sends a second request message to the network device.

After the eRelay UE receives the first request message sent by the eRemote UE, the eRelay UE sends a second request message to the network device, where the second request message may be a key request key request message, and the second request message is used to request to obtain a root key for communicating with the eRemote UE. The second request message includes the identity information of the eRemote UE that is obtained from the first request message.

S303. The network device obtains a root key of the remote terminal and identity information of the root key.

The root key of the remote terminal is a PRUK, and the identity information of the root key is a PRUK ID.

If the identity of the eRemote UE in the second request message is the PRUK ID, because the network device stores a correspondence between the PRUK ID and the PRUK, the network device obtains the PRUK based on the PRUK ID.

If the identity of the eRemote UE in the second request message is other identity information than the PRUK ID, the network device obtains an IMSI of the eRemote UE based on the identity information of the eRemote UE. A manner of obtaining the IMSI is consistent with the method in operation 203 in FIG. 2, and is not described again herein. The network device obtains GPI information of the eRemote UE based on the IMSI, where the GPI information is obtained by the network device based on a universal bootstrapping process in a push mode. Depending on different implementations of a network architecture, a PKMF may directly obtain the GPI information, or the PKMF obtains an authentication vector of the eRemote UE, and locally generates the GPI information based on the authentication vector. When obtaining GPI, the PKMF further obtains a key Ks(_int/ext)_NAF, where the Ks(_int/ext)_NAF is a key generated based on the universal bootstrapping process in the push mode and used for communicating with the network device. In this process, the network device generates the push process temporary identifier P-TID, uses the Ks(_int/ext)_NAF as a root key of the remote terminal, uses an identity of the Ks(_int/ext)_NAF as the PRUK, and uses the P-TID as the PRUK ID. The PRUK ID may be specifically a UL NAF SA identifier. In one embodiment, the PRUK ID may also be a random number RAND in the GPI information.

S304. The network device sends the root key of the remote terminal and the identity information of the root key to a home subscriber server HSS.

In one embodiment, the identity of the eRemote UE or an identity of the eRelay UE, such as IMSIs of the eRelay UE and the eRemote UE, may be sent together with the root key of the remote terminal and the identity information of the root key to the HSS. In this specification, a manner of storing the root key of the remote terminal and the identity information of the root key is not limited. The HSS may store the root key of the remote terminal and the identity information of the root key in data of the eRemote UE or data of the eRelay UE.

S305. The network device sends the root key of the remote terminal and the identity information of the root key to a mobility management entity to which the relay terminal belongs.

Specifically, the network device sends the root key of the eRemote UE and the identity information of the root key by using the HSS to a mobility management entity to which the eRelay UE belongs. The process may be implemented by using the following sub operations:

S3051. The network device sends an update proximity service policy data request message to the HSS, where the request message includes the PRUK and the PRUK ID of the eRemote UE, and the identity of the eRelay UE, such as the IMSI of the eRelay UE, is further included in this operation.

S3052. The HSS updates, by using an insert subscriber data message, data on the mobility management entity to which the eRelay UE belongs, where the PRUK and the PRUK ID may be stored on the mobility management entity of the eRelay UE, or stored in a context of the eRelay UE on the mobility management entity.

S3053. The MME returns a response message with respect to the insert subscriber data message.

S304 and S305 in this embodiment are two optional operations. To be specific, either S304 or S305 may be selected as a operation implemented in this application.

S306. The network device returns a response message with respect to the second request message to the relay terminal.

In the process, the network device performs another process of establishing a communications connection between the eRemote UE and the eRelay UE, and generates a root key Kd for communication between the eRemote UE and the eRelay UE and a freshness parameter for generating the root key.

The response message includes the identity of the Remote UE, the Kd generated by the network device, and the freshness parameter for generating the root key. If the network device obtains the GPI, the response message needs to further include the GPI information.

S307. The relay terminal sends a direct security mode command to the remote terminal.

After receiving the key response message, the eRelay UE sends a direct security mode command to the eRemote UE, to perform security negotiation with the eRemote UE, where the direct security mode command includes the Kd, Kd freshness parameter, and GPI information that are received in the key response message.

S308. The remote terminal returns a direct security mode complete message.

The eRemote UE generates the Kd based on the root key PRUK of the eRemote UE, and further generates a session key based on the Kd to protect communication between the eRemote UE and the eRelay UE. In this operation:

if the PRUK and the PRUK ID are configured for the eRemote UE, the PRUK is the root key of the eRemote UE; or if the PRUK and the PRUK ID are not configured for the eRemote UE, the eRemote UE generates the Ks(_int/ext)_NAF based on the GPI information received in operation S207, uses the Ks(_int/ext)_NAF as the PRUK, and uses the P-TID in the GPI information as the PRUK ID.

S309. The relay terminal returns a direct communication accept message.

S310. The remote terminal sends a first message to a mobility management entity of a core network.

The first message may be an attach message sent by the eRemote UE, or an identity response message returned by the eRemote UE in response to an identity request of the mobility management entity. When the eRemote UE needs to use the IMSI as the identity of the eRemote UE, to hide the IMSI, the eRemote UE should use the first identity information as the identity of the eRemote UE. The first message includes first information, where the first information includes the IMSI of the remote terminal.

Before the eRemote UE sends the first message, the following operations are performed:

S3101. The remote terminal generates a first key based on the root key of the remote terminal, and encrypts first information by using the first key.

The eRemote UE generates a Key_enc_IMSI based on the PRUK, where the Key_enc_IMSI is an encryption key. Further, an identity of an encryption algorithm selected by the eRemote UE may be a piece of input information for generating the Key_enc_IMSI. The eRemote UE encrypts the first information by using the Key_enc_IMSI and based on the selected encryption algorithm.

In one embodiment, the first information may further include other parameters in the first message, for example, non-security-related parameters of the eRemote UE, but should not include the identity of the encryption algorithm selected by the eRemote UE, an integrity protection algorithm in operation S209, and the PRUK ID.

S3102. The remote terminal generates a second key based on the root key of the remote terminal, and performs integrity protection on the first information by using the second key, to generate MAC information.

The eRemote UE generates a Key_int_IMSI based on the PRUK, where the Key_int_IMSI is an integrity protection key. Further, an identity of the integrity protection algorithm selected by the eRemote UE may be a piece of input information for generating the Key_int_IMSI. The eRemote UE performs integrity protection on the first information by using the Key_int_IMSI and based on the selected integrity protection algorithm, to generate MAC information.

In one embodiment, the first information may include other parameters in the first message, and the eRemote UE may perform integrity protection on the first information and other information, or may perform integrity protection on the first message, to generate MAC information.

The input information of integrity protection further includes fresh information fresh information, where the fresh information may be time information, or a NAS count, or an SQN value obtained by the eRemote UE by using AUTN in the GPI information.

It should be noted that, a sequence of performing encryption and integrity protection by the eRemote UE is not limited in this embodiment of this application. To be specific, the MAC information generated by the eRemote UE may be obtained after integrity protection is performed on the first information that is encrypted or not encrypted.

S3103. The remote terminal sends the first message to the mobility management entity.

The first message includes the encrypted first information, the MAC information, the identity of the encryption algorithm selected by the eRemote UE, the identity of the integrity protection algorithm selected by the eRemote UE, the PRUK ID, and other parameters of the first message.

S311. The mobility management entity receives the first message sent by the remote terminal.

S312. The mobility management entity obtains the root key of the remote terminal based on an identity of the root key of the remote terminal.

The mobility management entity may obtain the root key of the remote terminal in the following manner:

The mobility management entity sends a fourth request message to the home subscriber server HSS, where the fourth request message includes the identity of the root key of the eRemote UE that is received in the first message, and receives a response message returned by the HSS with respect to the fourth request message, where the response message includes the root key of the eRemote UE; or if the mobility management entity already stores a correspondence between the root key of the eRemote UE and the identity information of the root key of the eRemote UE, the mobility management entity determines the root key of the eRemote UE based on the stored correspondence between the root key of the eRemote UE and the identity information of the root key of the eRemote UE; or if the mobility management entity does not store a correspondence between the root key of the eRemote UE and the identity information of the root key of the eRemote UE, the mobility management entity may further determine the mobility management entity to which the eRelay UE belongs, send a fifth request message to the mobility management entity to which the eRelay UE belongs, where the fifth request message includes the identity of the root key of the eRemote UE that is received in the first message, and receive a response message returned by the mobility management entity to which the eRelay UE belongs with respect to the fifth request message, where the response message includes the root key of the eRemote UE.

S313. The mobility management entity generates a symmetric key of the first key based on the root key of the remote terminal, and decrypts the first information by using the symmetric key of the first key, to obtain the IMSI of the remote terminal.

The mobility management entity generates a symmetric key of the Key_enc_IMSI in a manner same as that in operation S208, and decrypts the first information by using the symmetric key of the Key_enc_IMSI and based on the encryption algorithm in the first message, to obtain the IMSI in the first information.

In an optional solution of this embodiment of this application, when the first message further includes the MAC information, the following operation may be performed:

S314. The mobility management entity generates a symmetric key of the second key based on the root key of the remote terminal, and verifies the MAC information by using the symmetric key of the second key, to verify integrity of information including at least the first information.

The mobility management entity generates a symmetric key of the Key_int_IMSI in a same manner as that in operation S209, and verifies the MAC by using the symmetric key of the Key_int_IMSI and based on the integrity protection algorithm in the first message, to verify integrity. The mobility management entity should further verify validity of the fresh information. Specifically, when the fresh information is time information, the mobility management entity needs to verify that a difference between received time information and time information of the mobility management entity is within an allowed time range; when the fresh information is a NAS count, the mobility management entity verifies that the received NAS count is not used; or when the fresh information is an SQN, the MME sends the SQN to the HSS/Auc, requesting the HSS/Auc to verify validity of the SQN.

A sequence of decryption and integrity verification by the mobility management entity depends on a sequence of performing encryption and integrity protection by the eRemote UE, and is not limited in this specification.

S315. The mobility management entity continues to perform other processes of the first message.

For example, the mobility management entity may obtain the authentication vector of the eRemote UE, initiate authentication to the eRemote UE, and create a context for the eRemote UE after the authentication succeeds.

It should be noted that, the mobility management entity may store, in the context of the eRemote UE, the root key of the eRemote UE and the identity of the root key that are obtained, where the root key of the eRemote UE and the identity of the root key that are stored are valid in a time period or are valid within a quantity of use times.

By using the method for protecting privacy according to this embodiment of this application, when the remote terminal is attached to the network by using the relay terminal, the remote terminal encrypts the first information by using the root key and performs integrity protection on at least the first information; and the mobility management entity obtains the root key of the remote terminal based on the identity of the root key of the remote terminal, and further decrypts the encrypted first information to obtain the IMSI and verify integrity of the information including at least the first information. Therefore, user privacy is protected.

The foregoing mainly describes the solutions of the embodiments of this application from a perspective of interaction between the remote terminal, the relay terminal, the network device, the mobility management entity, and the like. It may be understood that, to implement the foregoing functions, the remote terminal, the relay terminal, the network device, the mobility management entity, and the like include corresponding hardware structures and/or software modules for performing the functions. A person skilled in the art should easily be aware that, in combination with the examples described in the embodiments disclosed in this specification, units and algorithm operations may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, functional units in the access network device, the terminal device, and the like may be defined according to the foregoing method examples. For example, each functional unit may be defined in a correspondence to each function, or two or more functions may be integrated into one processing unit. The integrated unit may be implemented in a form of hardware, or may be implemented in a form of a software functional unit. It should be noted that, in the embodiments of this application, unit division is an example, and is merely logical function division. In actual implementation, another division manner may be used.

Figure 4:
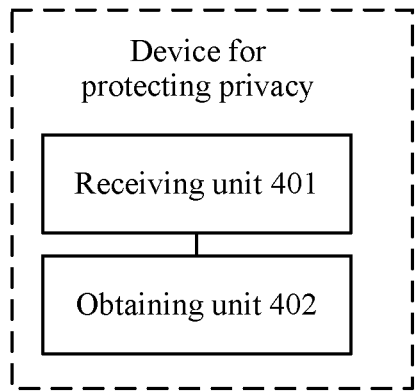
FIG. 4 is a first schematic structural diagram of a device for protecting privacy according to an embodiment of this application.

When an integrated unit is used, FIG. 4 shows a first possible schematic structural diagram of a device for protecting privacy in the foregoing embodiment, where the device for protecting privacy may be a remote terminal (eRemote UE). As shown in FIG. 4, the device includes:

a sending unit 401, configured to send a first message to a mobility management entity by using a relay terminal, where the first message includes first identity information of the remote terminal, and the first message is used by the mobility management entity to obtain an international mobile subscriber identity IMSI of the remote terminal based on the first identity information of the remote terminal, where the first identity information is a proximity service relay user key identity PRUK ID.

In one embodiment, the sending unit 401 is further configured to send a first request message to the relay terminal, where the first request message is used to request to establish a communications connection between the remote terminal and the relay terminal, the first request message includes second identity information of the remote terminal, and the second identity information is used by a network device to obtain the IMSI of the remote terminal; and the device further includes an obtaining unit 402, configured to obtain, by using the relay terminal, the first identity information sent by the network device.

In one embodiment, the second identity information of the remote terminal is any one of the following: a mobile subscriber international identity MSISDN of the remote terminal, a temporary private identity of the remote terminal that is generated in a bootstrapping process, a bootstrapping interaction identifier B-TID of the remote terminal that is generated in a bootstrapping process, a push temporary identifier P-TID of the remote terminal that is generated in a bootstrapping push process initiated by the network device, an identity allocated by the network device for discovery, or a public identity allocated by the network device to the remote terminal.

The device for protecting privacy may be used as the remote terminal in the method for protecting privacy in FIG. 2, and perform the operation performed by the remote terminal in FIG. 2. Because the PRUK ID is used to replace the IMSI, interception of the IMSI by the relay terminal is avoided, and user privacy is protected.

Figure 5:
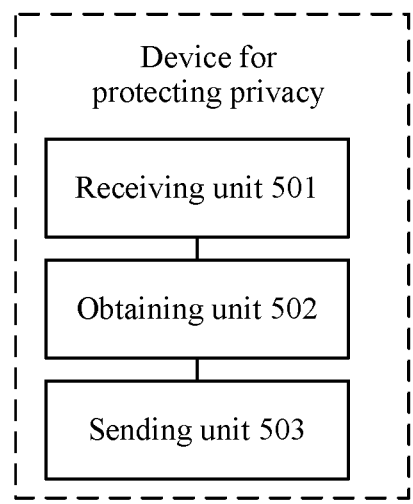
FIG. 5 is a second schematic structural diagram of a device for protecting privacy according to an embodiment of this application.

When an integrated unit is used, FIG. 5 shows a second possible schematic structural diagram of a device for protecting privacy in the foregoing embodiment, where the device for protecting privacy may be a network device. As shown in FIG. 5, the device includes:

a receiving unit 501, configured to receive a second request message sent by a relay terminal, where the second request message includes first identity information or second identity information of a remote terminal, the second request message is sent after the relay terminal receives a first request message from the remote terminal, and the first request message is used to request to establish a communications connection between the remote terminal and the relay terminal; an obtaining unit 502, configured to obtain the first identity information and an international mobile subscriber identity IMSI of the remote terminal; and a sending unit 503, configured to send the first identity information and the IMSI of the remote terminal to a home subscriber server HSS, so that the HSS stores a correspondence between the first identity information and the IMSI of the remote terminal; or send, by the network device, the first identity information and the IMSI of the remote terminal to a mobility management entity, so that the mobility management entity stores a correspondence between the first identity information and the IMSI of the remote terminal.

In one embodiment, the obtaining unit 502 is configured to determine the IMSI of the remote terminal based on the first identity information, thereby obtaining the first identity information and the IMSI of the remote terminal; or determine the international mobile subscriber identity IMSI of the remote terminal based on the second identity information, and generate, by the network device, the first identity information, so that the network device obtains the first identity information and the IMSI of the remote terminal.

In one embodiment, the sending unit 503 is configured to send a third request message to the home subscriber server HSS, where the third request message includes the first identity information and the IMSI of the remote terminal.

In one embodiment, the sending unit 503 is configured to send a fourth request message to the home subscriber server HSS, so that the HSS sends a fifth request message to the mobility management entity, where the fourth request message includes the first identity information and the IMSI of the remote terminal, and the fifth request message includes the first identity information and the IMSI of the remote terminal.

In one embodiment, the first identity information is a proximity service relay user key identity PRUK ID.

In one embodiment, the second identity information of the remote terminal is any one of the following: a mobile subscriber international identity MSISDN of the remote terminal, a temporary private identity of the remote terminal that is generated in a bootstrapping process, a bootstrapping interaction identifier B-TID of the remote terminal that is generated in a bootstrapping process, a push temporary identifier P-TID of the remote terminal that is generated in a bootstrapping push process initiated by the network device, an identity allocated by the network device for discovery, or a public identity allocated by the network device to the remote terminal.

The device for protecting privacy may be used as the network device in the method for protecting privacy in FIG. 2, and perform the operation performed by the network device in FIG. 2. Because the PRUK ID is used to replace the IMSI, interception of the IMSI by the relay terminal is avoided, and user privacy is protected.

Figure 6:
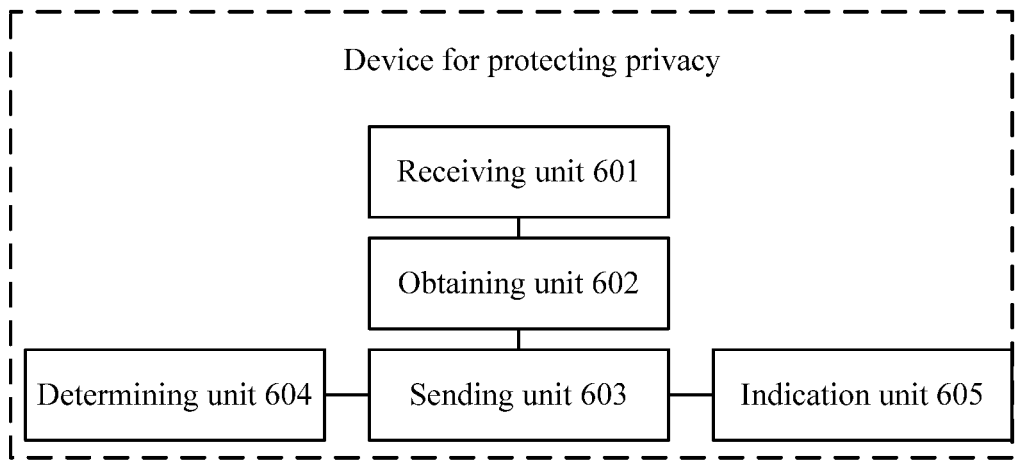
FIG. 6 is a third schematic structural diagram of a device for protecting privacy according to an embodiment of this application.

When an integrated unit is used, FIG. 6 shows a third possible schematic structural diagram of a device for protecting privacy in the foregoing embodiment, where the device for protecting privacy may be a core network device. As shown in FIG. 6, the device includes:

a receiving unit 601, configured to receive a first message sent by a remote terminal by using a relay terminal, where the first message includes first identity information of the remote terminal; and an obtaining unit 602, configured to obtain an international mobile subscriber identity IMSI of the remote terminal based on the first identity information of the remote terminal.

In one embodiment, the device further includes a sending unit 603, configured to send a first request message to a home subscriber server HSS, where the first request message includes the first identity information; and the receiving unit 601 is further configured to receive a response message returned by the HSS with respect to the first request message, where the response message includes the IMSI of the remote terminal; or the obtaining unit 602 is configured to obtain the IMSI of the remote terminal based on a stored correspondence between the first identity information and the IMSI of the remote terminal; or the sending unit 603 is further configured to determine a mobility management entity to which the relay terminal belongs, and send a second request message to the mobility management entity to which the relay terminal belongs, where the second request message includes the first identity information, and the receiving unit 601 is further configured to receive a response message returned by the mobility management entity to which the relay terminal belongs with respect to the second request message, where the response message includes the IMSI of the remote terminal.

In one embodiment, the device further includes: a determining unit 604, configured to determine, based on a length of the first identity information, that identity information of the remote terminal is the first identity information; or an indication unit 605, configured to indicate, based on indication information in the first identity information, that identity information of the remote terminal is the first identity information.

In one embodiment, the first identity information is a proximity service relay user key identity PRUK ID.

The device for protecting privacy may be used as the mobility management entity in the method for protecting privacy in FIG. 2, and perform the operation performed by the mobility management entity in FIG. 2. Because the PRUK ID is used to replace the IMSI of the remote terminal, interception of the IMSI of the remote terminal by the relay terminal is avoided, and user privacy is protected.

Figure 7:
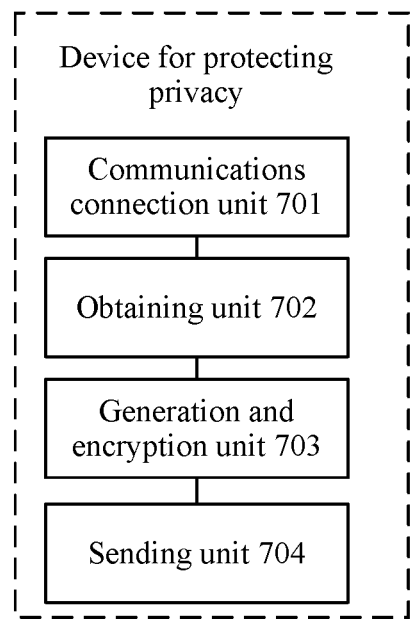
FIG. 7 is a fourth schematic structural diagram of a device for protecting privacy according to an embodiment of this application.

When an integrated unit is used, FIG. 7 shows a fourth possible schematic structural diagram of a device for protecting privacy in the foregoing embodiment, where the device for protecting privacy may be a remote terminal. As shown in FIG. 7, the device includes:

a communications connection unit 701, configured to establish a communications connection to a relay terminal; an obtaining unit 702, configured to obtain a root key of the remote terminal, where the root key of the remote terminal is used to protect communication between the remote terminal and the relay terminal; a generation and encryption unit 703, configured to generate a first key based on the root key of the remote terminal, and encrypt first information by using the first key, where the first information includes an international mobile subscriber identity IMSI of the remote terminal; and a sending unit 704, configured to send a second message to a mobility management entity, where the second message includes an encrypted first message and an identity of the root key of the remote terminal.

In one embodiment, the generation and encryption unit 703 is further configured to generate a second key based on the root key of the remote terminal, and perform integrity protection on the first information by using the second key, to generate MAC information, where the second message further includes the MAC information.

In one embodiment, the second message further includes at least one of the following: identity information of an encryption algorithm or identity information of an integrity protection algorithm used by the remote terminal.

In one embodiment, the communications connection unit 701 is configured to send a first request message to the relay terminal, where the first request message is used to request to establish the communications connection to the relay terminal, and the first request message includes first identity information of the remote terminal.

In one embodiment, the first identity information is any one of the following identities: a mobile subscriber international identity MSISDN of the remote terminal, a temporary private identity of the remote terminal that is generated in a bootstrapping process, a bootstrapping interaction identifier B-TID of the remote terminal that is generated in a bootstrapping process, a push temporary identifier P-TID of the remote terminal that is generated in a bootstrapping push process initiated by the network device, an identity allocated by the network device for discovery, or a public identity allocated by the network device to the remote terminal.

The device for protecting privacy may be used as the remote terminal in the method for protecting privacy in FIG. 3A and FIG. 3B, and perform the operation performed by the remote terminal in FIG. 3A and FIG. 3B in which the first message is encrypted and integrity protection is performed on at least the first message, and then the mobility management entity performs decryption and verification. Therefore, interception of the IMSI of the remote terminal by the relay terminal is avoided, and user privacy is protected.

Figure 8:
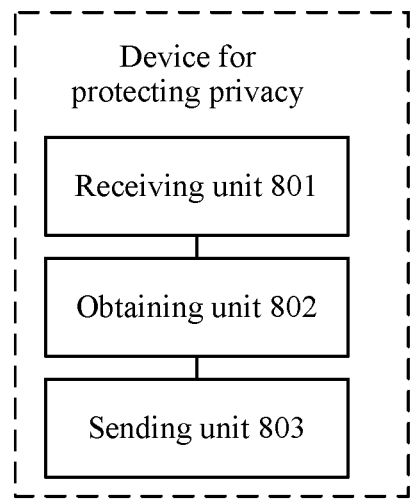
FIG. 8 is a fifth schematic structural diagram of a device for protecting privacy according to an embodiment of this application.

When an integrated unit is used, FIG. 8 shows a fifth possible schematic structural diagram of a device for protecting privacy in the foregoing embodiment, where the device for protecting privacy may be a network device. As shown in FIG. 8, the device includes:

a receiving unit 801, configured to receive a second request message sent by a relay terminal, where the second request message includes first identity information of a remote terminal, and the second request message is used to request to obtain a root key for communicating with the remote terminal; an obtaining unit 802, configured to obtain a root key of the remote terminal and identity information of the root key; and a sending unit 803, configured to send the root key of the remote terminal and the identity information of the root key to a home subscriber server HSS, or send, by the network device, the root key of the remote terminal and the identity information of the root key to a mobility management entity to which the relay terminal belongs.

In one embodiment, the sending unit 803 is configured to send, by the network device by using the HSS, the root key of the remote terminal and the identity information of the root key to the mobility management entity to which the relay terminal belongs.

The device for protecting privacy may be used as the network device in the method for protecting privacy in FIG. 3A and FIG. 3B, and perform the operation performed by the network device in FIG. 3A and FIG. 3B in which the first message is encrypted and integrity protection is performed on at least the first message, and then the mobility management entity performs decryption and verification. Therefore, interception of the IMSI by the relay terminal is avoided, and user privacy is protected.

Figure 9:
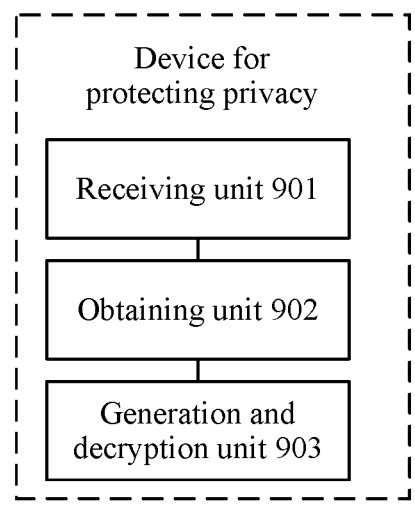
FIG. 9 is a sixth schematic structural diagram of a device for protecting privacy according to an embodiment of this application.

When an integrated unit is used, FIG. 9 shows a sixth possible schematic structural diagram of a device for protecting privacy in the foregoing embodiment, where the device for protecting privacy may be a network device. As shown in FIG. 9, the device includes:

a receiving unit 901, configured to receive a first message sent by a remote terminal, where the first message includes encrypted first information and an identity of a root key of the remote terminal, and the first information includes an international mobile subscriber identity IMSI of the remote terminal; an obtaining unit 902, configured to obtain the root key of the remote terminal based on the identity of the root key of the remote terminal; and a generation and decryption unit 903, configured to generate a first key based on the root key of the remote terminal, and decrypt the first information by using the first key, to obtain the IMSI of the remote terminal.

In one embodiment, the first message further includes at least one of the following: identity information of an encryption algorithm or identity information of an integrity protection algorithm used by the remote terminal; and when the first message includes the identity information of the encryption algorithm, the generation and decryption unit 903 is further configured to decrypt the first information by using the first key and based on the encryption algorithm corresponding to the identity information of the encryption algorithm; or when the first message includes the identity information of the integrity protection algorithm, the generation and decryption unit 903 is further configured to verify the MAC information by using the second key and based on the integrity protection algorithm corresponding to the identity information of the integrity protection algorithm; or when the first message includes the identity information of the encryption algorithm and the identity information of the integrity protection algorithm, the generation and decryption unit 903 is further configured to decrypt the first information by using the first key and based on the encryption algorithm corresponding to the identity information of the encryption algorithm, and verify, by the mobility management entity, the MAC information by using the second key and based on the integrity protection algorithm corresponding to the identity information of the integrity protection algorithm.

In one embodiment, the first message further includes identity information of an encryption algorithm and/or an integrity protection algorithm used by the remote terminal; and the generation and decryption unit 903 is further configured to decrypt the first information by using the first key and based on the encryption algorithm corresponding to the identity information of the encryption algorithm, and/or verify the MAC information by using the second key and based on the integrity protection algorithm corresponding to the identity information of the integrity protection algorithm.

In one embodiment, the obtaining unit 902 is configured to: send a second request message to a home subscriber server HSS, where the second request message includes the identity of the root key of the remote terminal that is received in the first message, and receive a response message returned by the HSS with respect to the second request message, where the response message includes the root key of the remote terminal; or determine the root key of the remote terminal based on a stored correspondence between the root key of the remote terminal and identity information of the root key of the remote terminal; or determine a mobility management entity to which a relay terminal belongs, send a third request message to the mobility management entity to which the relay terminal belongs, where the third request message includes the identity of the root key of the remote terminal that is received in the first message, and receive a response message returned by the mobility management entity to which the relay terminal belongs with respect to the third request message, where the response message includes the root key of the remote terminal.

The device for protecting privacy may be used as the mobility management entity in the method for protecting privacy in FIG. 2, and perform the operation performed by the mobility management entity in FIG. 2 in which the first message is encrypted and integrity protection is performed on at least the first message, and then the mobility management entity performs decryption and verification. Therefore, interception of the IMSI by the relay terminal is avoided, and user privacy is protected.

Figure 10:
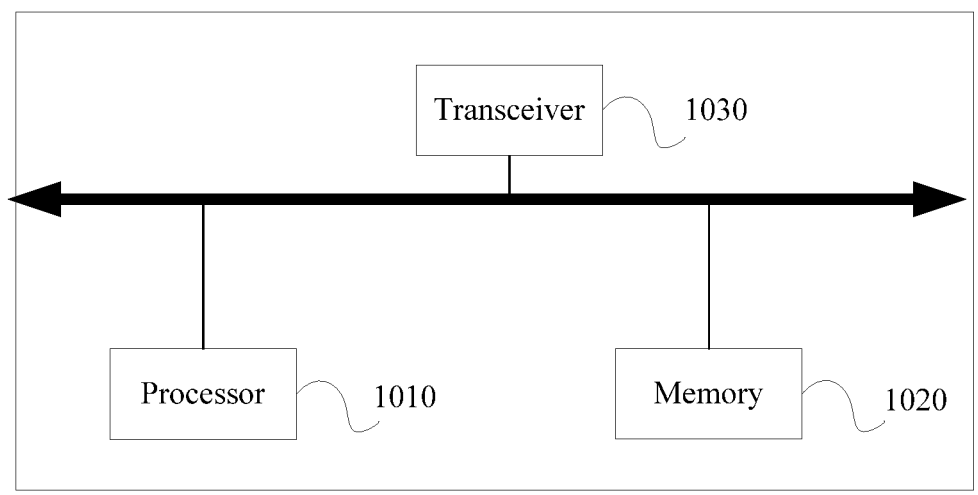
FIG. 10 is a first schematic structural diagram of hardware of a device for protecting privacy according to an embodiment of this application.

FIG. 10 is a first structural diagram of hardware of a device for protecting privacy according to an embodiment of this application. As shown in FIG. 10, the device includes a processor 1010, a memory 1020, and a transceiver 1030.

The processor 1010 may be a central processing unit (CPU), or a combination of a CPU and a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory 1020 is configured to store various applications, an operating system, and data. The memory 1020 may transmit the stored data to the processor 1010. The memory 1020 may include a volatile memory, for example, a non-volatile dynamic random access memory (NVRAM), a phase change random access memory (PRAM), or a magnetoresistive random access memory (MRAM), and may further include a nonvolatile memory, for example, at least one disk storage device, an electrically erasable programmable read-only memory (EEPROM), or a flash memory such as a NOR flash memory or a NAND flash memory, and a semiconductor component, for example, a solid state disk (SSD). The memory 1020 may further include a combination of the foregoing types of memories.

It may be understood that, the memory 1020 may be integrated in the processor 1010, or may exist independently.

Working processes of the components are as follows:

The transceiver 1030 is configured to send a first message to a mobility management entity by using a relay terminal, where the first message includes first identity information of the remote terminal, and the first message is used by the mobility management entity to obtain an international mobile subscriber identity IMSI of the remote terminal based on the first identity information of the remote terminal, where the first identity information is a proximity service relay user key identity PRUK ID.

In one embodiment, the transceiver 1030 is further configured to send a first request message to the relay terminal, where the first request message is used to request to establish a communications connection between the remote terminal and the relay terminal, the first request message includes second identity information of the remote terminal, and the second identity information is used by a network device to obtain the IMSI of the remote terminal; and the processor 1010 is configured to obtain, by using the relay terminal, the first identity information sent by the network device.

In one embodiment, the second identity information of the remote terminal is any one of the following: a mobile subscriber international identity MSISDN of the remote terminal, a temporary private identity of the remote terminal that is generated in a bootstrapping process, a bootstrapping interaction identifier B-TID of the remote terminal that is generated in a bootstrapping process, a push temporary identifier P-TID of the remote terminal that is generated in a bootstrapping push process initiated by the network device, an identity allocated by the network device for discovery, or a public identity allocated by the network device to the remote terminal.

The device for protecting privacy may be used as the remote terminal in the method for protecting privacy in FIG. 2, and perform the operation performed by the remote terminal in FIG. 2. Because the PRUK ID is used to replace the IMSI, interception of the IMSI of the remote terminal by the relay terminal is avoided, and user privacy is protected.

Figure 11:
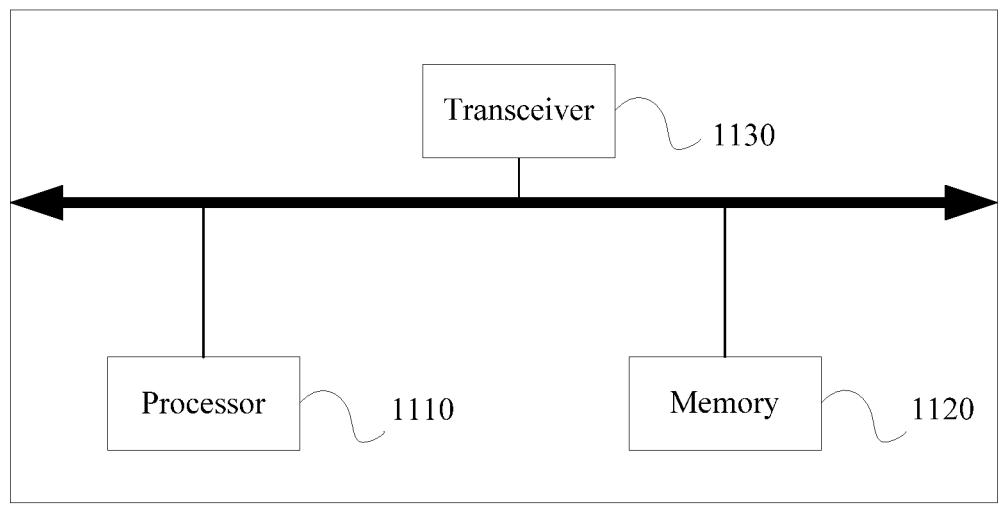
FIG. 11 is a second schematic structural diagram of hardware of a device for protecting privacy according to an embodiment of this application.

FIG. 11 is a second structural diagram of hardware of a device for protecting privacy according to an embodiment of this application. As shown in FIG. 11, the device includes a processor 1110, a memory 1120, and a transceiver 1130.

The processor 1110 may be the same as the processor 1010.

The memory 1120 is configured to store various applications, an operating system, and data. The memory 1120 may be the same as the memory 1020.

It may be understood that, the memory 1120 may be integrated in the processor 1110, or may exist independently.

Working processes of the components are as follows:

The transceiver 1130 is configured to receive a second request message sent by a relay terminal, where the second request message includes first identity information or second identity information of a remote terminal, the second request message is sent after the relay terminal receives a first request message from the remote terminal, and the first request message is used to request to establish a communications connection between the remote terminal and the relay terminal;

the processor 1110 is configured to obtain the first identity information and an international mobile subscriber identity IMSI of the remote terminal; and the transceiver 1130 is further configured to send the first identity information and the IMSI of the remote terminal to a home subscriber server HSS, so that the HSS stores a correspondence between the first identity information and the IMSI of the remote terminal; or send, by the network device, the first identity information and the IMSI of the remote terminal to a mobility management entity, so that the mobility management entity stores a correspondence between the first identity information and the IMSI of the remote terminal.

In one embodiment, the processor 1110 is configured to determine the IMSI of the remote terminal based on the first identity information, thereby obtaining the first identity information and the IMSI of the remote terminal; or determine the international mobile subscriber identity IMSI of the remote terminal based on the second identity information, and generate, by the network device, the first identity information, so that the network device obtains the first identity information and the IMSI of the remote terminal.

In one embodiment, the transceiver 1130 is configured to send a third request message to the home subscriber server HSS, where the third request message includes the first identity information and the IMSI of the remote terminal.

In one embodiment, the transceiver 1130 is configured to send a fourth request message to the home subscriber server HSS, so that the HSS sends a fifth request message to the mobility management entity, where the fourth request message includes the first identity information and the IMSI of the remote terminal, and the fifth request message includes the first identity information and the IMSI of the remote terminal.

In one embodiment, the first identity information of the remote terminal is a proximity service relay user key identity PRUK ID.

In one embodiment, the second identity information of the remote terminal is any one of the following: a mobile subscriber international identity MSISDN of the remote terminal, a temporary private identity of the remote terminal that is generated in a bootstrapping process, a bootstrapping interaction identifier B-TID of the remote terminal that is generated in a bootstrapping process, a push temporary identifier P-TID of the remote terminal that is generated in a bootstrapping push process initiated by the network device, an identity allocated by the network device for discovery, or a public identity allocated by the network device to the remote terminal.

The device for protecting privacy may be used as the network device in the method for protecting privacy in FIG. 2, and perform the operation performed by the network device in FIG. 2. Because the PRUK ID is used to replace the IMSI, interception of the IMSI of the remote terminal by the relay terminal is avoided, and user privacy is protected.

Figure 12:
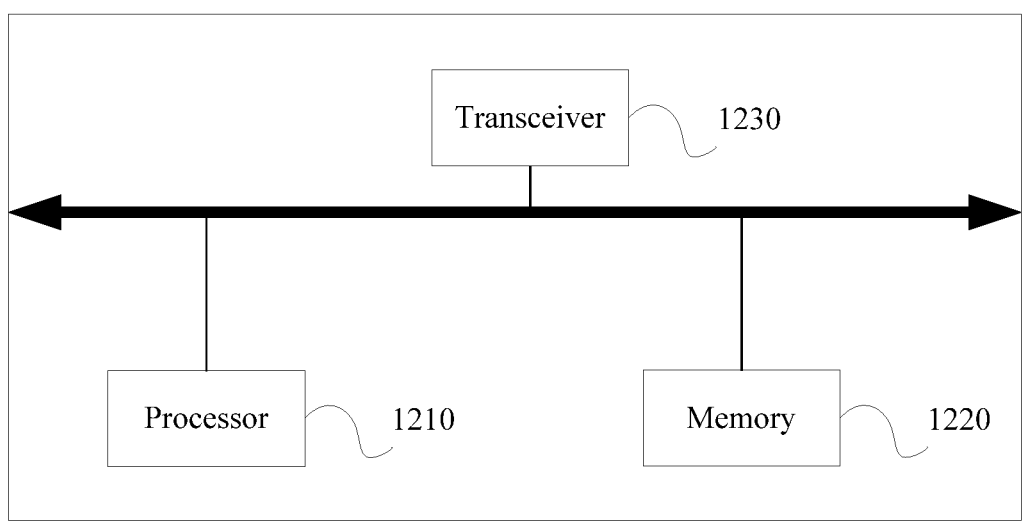
FIG. 12 is a third schematic structural diagram of hardware of a device for protecting privacy according to an embodiment of this application.

FIG. 12 is a third structural diagram of hardware of a device for protecting privacy according to an embodiment of this application. As shown in FIG. 12, the device includes a processor 1210, a memory 1220, and a transceiver 1230.

The processor 1210 may be the same as the processor 1010.

The memory 1220 is configured to store various applications, an operating system, and data. The memory 1220 may be the same as the memory 1020.

It may be understood that, the memory 1220 may be integrated in the processor 1210, or may exist independently.

Working processes of the components are as follows:

The transceiver 1230 is configured to receive a first message sent by a remote terminal by using a relay terminal, where the first message includes first identity information of the remote terminal; and the processor 1210 is configured to obtain an international mobile subscriber identity IMSI of the remote terminal based on the first identity information of the remote terminal.

In one embodiment, the transceiver 1230 is further configured to send a first request message to a home subscriber server HSS, where the first request message includes the first identity information, and receive a response message returned by the HSS with respect to the first request message, where the response message includes the IMSI of the remote terminal; or the processor 1210 is configured to obtain the IMSI of the remote terminal based on a stored correspondence between a first identity of the remote terminal and the IMSI of the remote terminal; or the transceiver 1230 is further configured to determine a mobility management entity to which the relay terminal belongs, send a second request message to the mobility management entity to which the relay terminal belongs, where the second request message includes the first identity information, and receive a response message returned by the mobility management entity to which the relay terminal belongs with respect to the second request message, where the response message includes the IMSI of the remote terminal.

In one embodiment, the processor 1210 is further configured to determine, based on a length of the first identity information, that identity information of the remote terminal is the first identity information; or indicate, based on indication information in the first identity information, that identity information of the remote terminal is the first identity information.

In one embodiment, the first identity information is a proximity service relay user key identity PRUK ID.

The device for protecting privacy may be used as the mobility management entity in the method for protecting privacy in FIG. 2, and perform the operation performed by the mobility management entity in FIG. 2. Because the PRUK ID is used to replace the IMSI, interception of the IMSI of the remote terminal by the relay terminal is avoided, and user privacy is protected.

Figure 13:
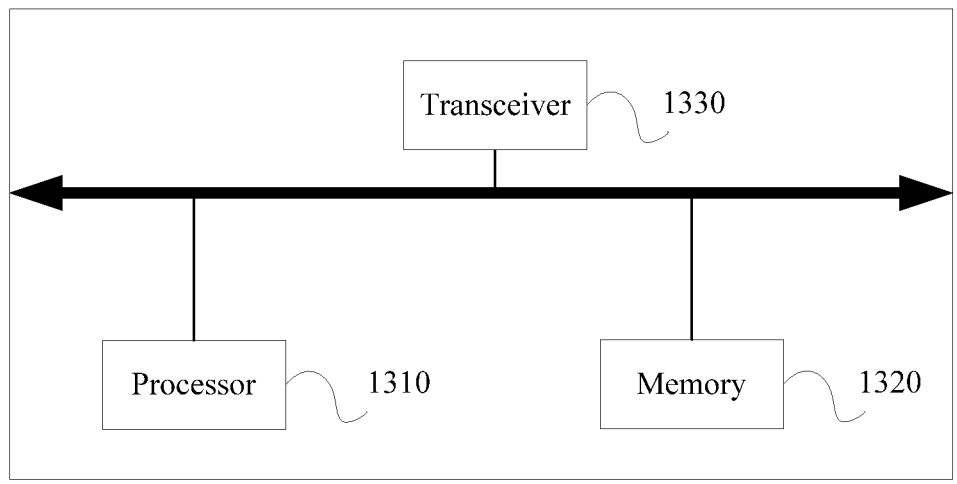
FIG. 13 is a fourth schematic structural diagram of hardware of a device for protecting privacy according to an embodiment of this application.

FIG. 13 is a fourth structural diagram of hardware of a device for protecting privacy according to an embodiment of this application. As shown in FIG. 13, the device includes a processor 1310, a memory 1320, and a transceiver 1330.

The processor 1310 may be the same as the processor 1010.

The memory 1320 is configured to store various applications, an operating system, and data. The memory 1320 may transmit the stored data to the processor 1310. The memory 1320 may be the same as the memory 1020.

It may be understood that, the memory 1320 may be integrated in the processor 1310, or may exist independently.

Working processes of the components are as follows:

The processor 1310 is configured to establish a communications connection to a relay terminal; obtain a root key of the remote terminal, where the root key of the remote terminal is used to protect communication between the remote terminal and the relay terminal; and generate a first key based on the root key of the remote terminal, and encrypt first information by using the first key, where the first information includes an international mobile subscriber identity IMSI of the remote terminal; and the transceiver 1330 is configured to send a second message to a mobility management entity, where the second message includes an encrypted first message and an identity of the root key of the remote terminal.

In one embodiment, the processor 1310 is further configured to generate a second key based on the root key of the remote terminal, and perform integrity protection on the first information by using the second key, to generate MAC information, where the second message further includes the MAC information.

In one embodiment, the second message further includes at least one of the following: identity information of an encryption algorithm or identity information of an integrity protection algorithm used by the remote terminal.

In one embodiment, the transceiver 1330 is further configured to send a first request message to the relay terminal, where the first request message is used to request to establish the communications connection to the relay terminal, and the first request message includes first identity information of the remote terminal.

In one embodiment, the first identity information is any one of the following identities: a mobile subscriber international identity MSISDN of the remote terminal, a temporary private identity of the remote terminal that is generated in a bootstrapping process, a bootstrapping interaction identifier B-TID of the remote terminal that is generated in a bootstrapping process, a push temporary identifier P-TID of the remote terminal that is generated in a bootstrapping push process initiated by the network device, an identity allocated by the network device for discovery, or a public identity allocated by the network device to the remote terminal.

The device for protecting privacy may be used as the remote terminal in the method for protecting privacy in FIG. 3A and FIG. 3B, and perform the operation performed by the remote terminal in FIG. 3A and FIG. 3B in which the first message is encrypted and integrity protection is performed on at least the first message, and then the mobility management entity performs decryption and verification. Therefore, interception of the IMSI of the remote terminal by the relay terminal is avoided, and user privacy is protected.

Figure 14:
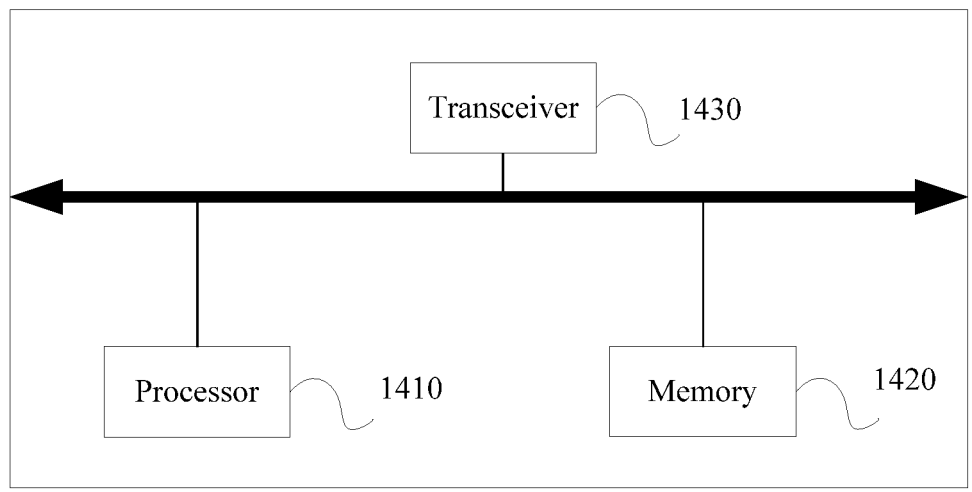
FIG. 14 is a fifth schematic structural diagram of hardware of a device for protecting privacy according to an embodiment of this application.

FIG. 14 is a fifth structural diagram of hardware of a device for protecting privacy according to an embodiment of this application. As shown in FIG. 14, the device includes a processor 1410, a memory 1420, and a transceiver 1430.

The processor 1410 may be the same as the processor 1010.

The memory 1420 is configured to store various applications, an operating system, and data. The memory 1420 may be the same as the memory 1020.

It may be understood that, the memory 1420 may be integrated in the processor 1410, or may exist independently.

Working processes of the components are as follows:

The transceiver 1430 is configured to receive a second request message sent by a relay terminal, where the second request message includes first identity information of a remote terminal, and the second request message is used to request to obtain a root key for communicating with the remote terminal; the processor 1410 is configured to obtain a root key of the remote terminal and identity information of the root key; and the transceiver 1430 is further configured to send the root key of the remote terminal and the identity information of the root key to a home subscriber server HSS, or send, by the network device, the root key of the remote terminal and the identity information of the root key to a mobility management entity to which the relay terminal belongs.

In one embodiment, the transceiver 1430 is further configured to send, by the network device by using the HSS, the root key of the remote terminal and the identity information of the root key to the mobility management entity to which the relay terminal belongs.

The device for protecting privacy may be used as the network device in the method for protecting privacy in FIG. 3A and FIG. 3B, and perform the operation performed by the network device in FIG. 3A and FIG. 3B in which the first message is encrypted and integrity protection is performed on at least the first message, and then the mobility management entity performs decryption and verification. Therefore, interception of the IMSI of the remote terminal by the relay terminal is avoided, and user privacy is protected.

Figure 15:
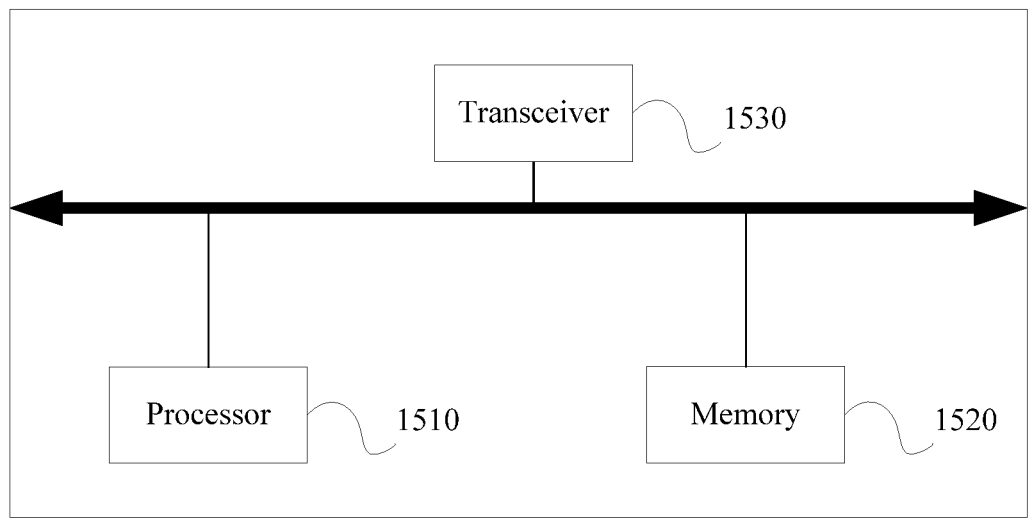
FIG. 15 is a sixth schematic structural diagram of hardware of a device for protecting privacy according to an embodiment of this application.

FIG. 15 is a sixth structural diagram of hardware of a device for protecting privacy according to an embodiment of this application. As shown in FIG. 15, the device includes a processor 1510, a memory 1520, and a transceiver 1530.

The processor 1510 may be the same as the processor 1010.

The memory 1520 is configured to store various applications, an operating system, and data. The memory 1520 may be the same as the memory 1020.

It may be understood that, the memory 1520 may be integrated in the processor 1510, or may exist independently.

Working processes of the components are as follows:

The transceiver 1530 is configured to receive a first message sent by a remote terminal, where the first message includes encrypted first information and an identity of a root key of the remote terminal, and the first information includes an international mobile subscriber identity IMSI of the remote terminal; and the processor 1510 is configured to obtain the root key of the remote terminal based on the identity of the root key of the remote terminal, generate a first key based on the root key of the remote terminal, and decrypt the first information by using the first key, to obtain the IMSI of the remote terminal.

In one embodiment, the first message further includes MAC information, and the MAC information is generated after the remote terminal performs integrity protection on the first information; and the processor 1510 is further configured to generate a second key based on the root key of the remote terminal, and verify the MAC information by using the second key, to verify integrity of the first information.

In one embodiment, the first message further includes at least one of the following: identity information of an encryption algorithm or identity information of an integrity protection algorithm used by the remote terminal; and when the first message includes the identity information of the encryption algorithm, the processor 1510 is further configured to decrypt the first information by using the first key and based on the encryption algorithm corresponding to the identity information of the encryption algorithm; or when the first message includes the identity information of the integrity protection algorithm, the processor 1510 is further configured to verify the MAC information by using the second key and based on the integrity protection algorithm corresponding to the identity information of the integrity protection algorithm; or when the first message includes the identity information of the encryption algorithm and the identity information of the integrity protection algorithm, the processor 1510 is further configured to decrypt the first information by using the first key and based on the encryption algorithm corresponding to the identity information of the encryption algorithm, and verify, by the mobility management entity, the MAC information by using the second key and based on the integrity protection algorithm corresponding to the identity information of the integrity protection algorithm.

In one embodiment, the transceiver 1530 is configured to send a second request message to a home subscriber server HSS, where the second request message includes the identity of the root key of the remote terminal that is received in the first message, and receive a response message returned by the HSS with respect to the second request message, where the response message includes the root key of the remote terminal; or the processor 1510 is configured to determine the root key of the remote terminal based on a stored correspondence between the root key of the remote terminal and identity information of the root key of the remote terminal; or the processor 1510 is configured to determine a mobility management entity to which a relay terminal belongs, the transceiver sends a third request message to the mobility management entity to which the relay terminal belongs, where the third request message includes the identity of the root key of the remote terminal that is received in the first message, and the transceiver receives a response message returned by the mobility management entity to which the relay terminal belongs with respect to the third request message, where the response message includes the root key of the remote terminal.

The device for protecting privacy may be used as the mobility management entity in the method for protecting privacy in FIG. 2, and perform the operation performed by the mobility management entity in FIG. 2 in which the first message is encrypted and integrity protection is performed on at least the first message, and then the mobility management entity performs decryption and verification. Therefore, interception of the IMSI by the relay terminal is avoided, and user privacy is protected.

An embodiment of this application further provides a computer program product including an instruction, where when the instruction is run on a computer, the computer is enabled to perform the method for protecting privacy as shown in FIG. 1 or FIG. 2, and achieve a technical effect of the method for protecting privacy as shown in FIG. 1 or FIG. 2.

An embodiment of this application further provides a computer-readable storage medium, where the computer-readable storage medium stores a computer program, and when the computer program is executed by a processor, the processor implements the method for protecting privacy as shown in FIG. 1 or FIG. 2, and achieves a technical effect of the method for protecting privacy as shown in FIG. 1 or FIG. 2.

A person skilled in the art may be further aware that, in combination with the examples described in the embodiments disclosed in this specification, units and algorithm operations can be implemented by electronic hardware, computer software, or a combination thereof. To clearly describe the interchangeability between the hardware and the software, the foregoing has generally described composition and operations of each example according to functions. Whether the functions are performed by hardware or software depends on particular applications and design constraints of the technical solutions. A person skilled in the art may use different methods to implement the described functions for each particular application, but it should not be considered that the implementation goes beyond the scope of this application.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the operations of the methods described in the embodiments of the present invention. The storage medium includes any medium that can store program code, such as a USB flash drive, a removable hard disk, a read-only memory ( ) a random access memory ( ) a magnetic disk, or an optical disc.

The foregoing descriptions are merely example specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A network device, comprising:
   at least one processor;
   and a memory coupled to the at least one processor
   and configured to store programming instructions that, when executed by the at least one processor cause the network device to perform operations comprising,
   receiving a second request message sent by a relay terminal,
   wherein the second request message comprises first identity information comprising a PRUK ID of the remote terminal,
   the second request message is sent after the relay terminal receives a first request message comprising the PRUK ID from a remote terminal,
   and the first request message is used to request establishing a communications connection between the remote terminal and the relay terminal;
   obtaining the first identity information and an international mobile subscriber identity (IMSI) of the remote terminal by using the PRUK ID in a query of a stored correspondence between PRUK ID and IMSI;
   and sending the first identity information and the IMSI of the remote terminal to a user data server,
   so that the user data server stores the correspondence between the first identity information and the IMSI of the remote terminal
   wherein the IMSI is not exposed to the relay terminal due to the stored correspondence thereby preventing leakage of the IMSI from the relay terminal.

2. The network device according to claim 1, wherein the operations further comprise:
   sending the first identity information and the IMSI of the remote terminal to a mobility management entity, so that the mobility management entity stores a correspondence between the first identity information and the IMSI of the remote terminal.

3. The network device according to claim 1, wherein the obtaining the first identity information and the IMSI of the remote terminal comprises:
   determining the IMSI of the remote terminal based on the first identity information, thereby obtaining the first identity information and the IMSI of the remote terminal.

4. The network device according to claim 1, wherein the obtaining the first identity information and the IMSI of the remote terminal comprises: determining the IMSI of the remote terminal based on a second identity information, and generating, by the network device, the first identity information, so that the network device obtains the first identity information and the IMSI of the remote terminal.

5. The network device according to claim 1, wherein the sending the first identity information and the IMSI of the remote terminal to the user data server comprises:
   sending a third request message to the user data server, wherein the third request message comprises the first identity information and the IMSI of the remote terminal.

6. The network device according to claim 1, wherein the sending the first identity information and the IMSI of the remote terminal to a mobility management entity comprises:
   sending a fourth request message to the user data server, so that the user data server sends a fifth request message to the mobility management entity, wherein the fourth request message comprises the first identity information and the IMSI of the remote terminal, and the fifth request message comprises the first identity information and the IMSI of the remote terminal.

7. The network device according to claim 1, wherein the first identity information is the PRUK ID which is a proximity service relay user key identity.

8. The network device according to claim 4, wherein the second identity information of the remote terminal is any one of the following: a mobile subscriber international identity (MSISDN) of the remote terminal, a temporary private identity of the remote terminal that is generated in a bootstrapping process, a bootstrapping interaction identifier (B-TID) of the remote terminal that is generated in a bootstrapping process, a push temporary identifier (P-TID) of the remote terminal that is generated in a bootstrapping push process initiated by the network device, an identity allocated by the network device for discovery, or a public identity allocated by the network device to the remote terminal.

* * * * *